United States Patent
Rosenkrantz et al.

(10) Patent No.: US 11,392,997 B2
(45) Date of Patent: Jul. 19, 2022

(54) SYSTEMS AND METHODS FOR CURATING AND DISTRIBUTING CONTENT

(71) Applicant: Strikepoint Media LLC, Laguna Beach, CA (US)

(72) Inventors: Bryan Maxwell Rosenkrantz, Laguna Beach, CA (US); Jeremy Gordon Blossom, Laguna Beach, CA (US)

(73) Assignee: STRIKEPOINT MEDIA, INC., Laguna Beach, CA (US)

(*) Notice: Subject to any disclaimer, the term of this patent is extended or adjusted under 35 U.S.C. 154(b) by 0 days.

(21) Appl. No.: 17/239,400

(22) Filed: Apr. 23, 2021

(65) Prior Publication Data

US 2021/0390589 A1    Dec. 16, 2021

Related U.S. Application Data

(63) Continuation of application No. 63/014,625, filed on Apr. 23, 2020.

(51) Int. Cl.
*G06Q 30/02* (2012.01)
*G06F 3/0482* (2013.01)

(52) U.S. Cl.
CPC ..... *G06Q 30/0277* (2013.01); *G06Q 30/0276* (2013.01); *G06F 3/0482* (2013.01)

(58) Field of Classification Search
CPC ............ G06Q 30/0276; G06Q 30/0277
USPC ................................................ 705/14.1
See application file for complete search history.

(56) References Cited

U.S. PATENT DOCUMENTS

2016/0050446 A1* 2/2016 Fujioka ............... A63F 13/792
725/93

* cited by examiner

*Primary Examiner* — Azam A Ansari
(74) *Attorney, Agent, or Firm* — Morgan, Lewis & Bockius, LLP

(57) ABSTRACT

Systems and methods for curating and distributing content are provided. A listing of a plurality of content items and an access condition form is presented to a user. Each respective content item is associated with a corresponding resource allotment, source, classification, and content item access conditions. The listing includes a first virtual bin that includes some content items, and a second virtual bin for each respective content item that is not in the first virtual bin. The access condition form includes initial prompts. Upon detecting a selection of a respective content item of the second virtual bin, the item is reassigned to the first virtual bin and the access condition form is updated and re-presented. A plurality of responses to updated prompts is then received. Each content item in the first virtual bin is distributed to an address associated with the user, thereby curating and distributing the content items.

20 Claims, 23 Drawing Sheets

400

(402) A method for curating and distributing at least one content item.

(404) Presenting, via a display, a listing of a plurality of content items and an access condition form. The plurality of content items comprises a first content item selected by a first user and a second content item selected by a second user from a catalog of content items. Each respective content item in the catalog of content items is associated with a corresponding resource allotment, a corresponding publication source, a corresponding classification in a plurality of classifications, and a corresponding plurality of content item access condition. Each content item in the plurality of content items is associated with the corresponding classification in the plurality of classifications of the first content item. The association of the at least one other content item to a respective content item is determined by the second user. The listing of the plurality of content items comprises a first virtual bin that provides a corresponding graphical description for each respective content item in the plurality of content items selected by the first user, and a second virtual bin that provides the corresponding graphical description for each respective content item in the plurality of content items that is both associated with a content item in the first virtual bin and not present in the first virtual bin. The access condition form comprises an initial set of prompts collectively produced from each corresponding plurality of content item access conditions associated with each respective content item in the first virtual bin.

(406) Detecting, responsive to the presenting the listing of the plurality of content items and the access condition form, a selection by the first user of a respective content item of the second virtual bin.

(408) Upon detecting the selection by the first user of a respective content item of the second virtual bin, reassigning the respective content item from the second virtual bin to the first virtual bin.

(410) Updating and presenting, based on the detecting the selection by the first user, via the display, the access condition form by updating the initial set of prompts to an updated set of prompts, wherein the updated set of prompts is collectively produced from the corresponding plurality of content item access conditions associated with each respective content item in the first virtual bin after the reassigning the respective content item.

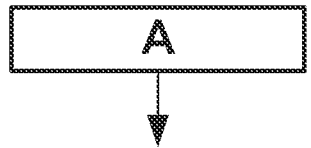

(412) Receiving, from the first user, a plurality of responses to the updated set of prompts. The plurality of responses satisfies each corresponding content item access condition in the corresponding plurality of content item access conditions associated with each respective content item in the first virtual bin after the reassigning the respective content item.

(414) Distributing, in accordance with a determination that each content item access condition in the corresponding plurality of content item access conditions associated with each respective content item in the first virtual bin is satisfied by the plurality of responses. Each content item in the first virtual bin of the detecting the selection by the first user to an address associated with the first user, thereby curating and distributing the at least one content item.

Your Free Investors Guides
Make additional selections below 610-1

630-1

Secrets To Find Winning Penny Stocks
Learn How to Spot the Most Profitable Penny Stocks 214-1
216-1

*from: Trade Stocks* 218-1

Add More Free Guides
Yes, they are ALL free ☺

630-2

25 Tips to Boost Profits Trading Options
Turn Your Nest Egg Into a Profitable Income Stream 214-2
216-2

*from: Trade Stocks* 218-1

610-2

630-3

5 Undervalued Next Gen Tech Stocks
Undervalued 5G Stocks Investors Can Cash in on Today 214-3
216-3

*from: Trade Stocks* 218-1

630-4
214-4

How To Retire Rich Using Just 3 Stocks
Retire Rich with Jeff Clark Trader in this Exclusive Offer

*from: Trade Stocks* 218-1

216-4

Enter Your Email Address
You will receive an email with a download link for each guide that you selected

620

First Name 622-1
Jane

Email 622-2
jane.doe@email.com

704
Send Downloads to My Inbox!
No Credit Card Required

222-1
By submitting the form you agree to receive updates and special offers from the following:
Trade Stocks via Text, Email, Phone, Privacy Policy You make opt out at any time.

Your Free Investors Guides
Make additional selections below — 610-1

630-1 —
Are you sure you want to remove this from your cart?

Add More Free Guides
Yes, they are ALL free ☺

630-2 —
214-2 —
25 Tips to Boost Profits Trading Options
Turn Your Nest Egg into a Profitable Income Stream
from: Trade Stocks — 218-1

610-2

630-3 —
214-3 —
5 Undervalued Next Gen Tech Stocks
Undervalued 5G Stocks Investors Can Cash in on Today
from: Trade Stocks — 218-1

630-4 —
214-3 —
How To Retire Rich Using Just 3 Stocks
Retire Rich with Jeff Clark Trader in this Exclusive Offer
from: Trade Stocks — 218-1

Enter Your Email Address
You will receive an email with a download link for each guide that you selected — 620

First Name
622-1 — First Name

Email
622-2 — Email

704 — Send Downloads to My Inbox!
No Credit Card Required

By submitting the form you agree to receive updates and special offers from the following:
Trade Stocks via Text, Email, Phone, Privacy Policy You make opt out at any time.

Figure 6D 600-5

Thank you, Rebecca!

Please wait to be directed to our
confirmation page. We are processing and
sending your download links to
rebecca@email.com as we speak!

600-6

Your Order Confirmation #14082

214-1

Secrets To Find Winning Penny Stocks

Please note: If you can't find your confirmation email, please check your spam folder.

Looking for Today's HOTTEST Opportunities?

We've curated the hottest investment reports for 2020. Please enjoy complimentary access to our latest exclusive report.

Learn How to Mark More Money Trading Stocks!

214-5

Get free stock trading lessons from Investors Business Daily, the leader in investing education for over 35 years.

Get Free Access Today

Find out how to put profit in the stock market with 12 daily lessons delivered to your inbox! You'll learn:

- How to Pick Winning Stocks
- Simple Buying and Selling Rules for Bigger Profits
- How to Build and Manage Your Portfolio
- How to Read Stock Charts Like a Pro
- Time-Saving Shortcuts for Stock Research
- Swing Trading Strategies for Quicker Profits
- An Investing System that Beats the Indexes
- Plus you'll get free videos, webinars, infographics and de-

Expand

} 750

Figure 6F 600-7
Order Confirmation #13082
inbox
Trade Stocks — 218-1
To: me — 304-1
ORDER CONFIRMATION
Hey Rebecca,
Thank you for your recent registration on Trade Stocks. To confirm and access your order please click on the access links for each item below.
Your (1) Order Items
*Please note, all access and download links will remain active for 24 hours after receiving this email.*
Secrets To Find — 214-1
Figure 6G 600-9

700-1
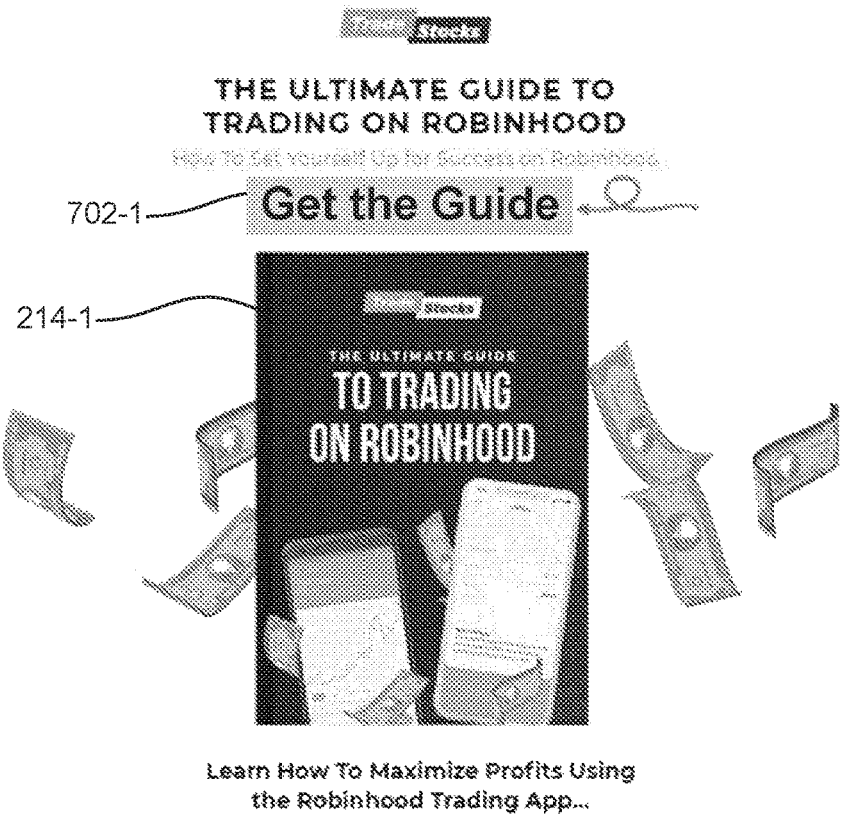
Figure 7A 700-5

Thank you, Rebecca!

Please wait to be directed to our confirmation page. We are processing and sending your your download links to rebecca@email.com as we speak!

SYSTEMS AND METHODS FOR CURATING AND DISTRIBUTING CONTENT

CROSS-REFERENCE TO REPLACED APPLICATION

The present Application claims priority to U.S. Provisional Application No. 63/014,625, entitled "Systems and Methods for Generating and Evaluating Leads," filed Apr. 23, 2020, which is hereby incorporated by reference in its entirety.

TECHNICAL FIELD

The present disclosure generally relates to systems and methods for providing content. More particularly, the present disclosure relates to systems and methods designed to curate content and distribute the curated content.

BACKGROUND

Customer lead generation is an essential task for entities that participate in digital markets. However, acquiring new customers has presented a significant challenge to entities in comparison to retaining current customers. Sandman, 2021, "Customer Acquisition Development Plan: Improving Lead Generation," print. As such, a customer lead, also known as a lead, is a potential customer that expresses an interest in the products or services offered by an entity.

Conventional solutions to generating customer leads are laborious and resource intensive. For instance, one solution requires tedious, manual effort "brute force" approaches such as manually designing and generating landing pages that promote a product. However, such manually intensive approaches fail to adapt to changing trends in markets or customer sentiments given the static nature of each landing page and the requirement of human involvement in the design and generation of suitable landing pages.

Another conventional solution to generating customer leads utilizes data associated with a population of users and a population of landing pages in order to guide particular users to particular landing pages. This approach segments a user population based on their probability of engaging with an entity and discards those users that do not satisfy a threshold probability. By discarding users, this conventional approach does not allow for a mechanism to engage with the discarded users. Moreover, the landing pages are pre-configured, such that users that satisfy the threshold probability are sent to one of the pre-configured landing pages and cannot engage with personalized content. Rahman, 2012, "A Data Mining Framework for Automatic Online Customer Lead Generation," print.

Given the above background, there is a need in the art for improved systems and methods for lead generation.

The information disclosed in this Background of the Invention is only for the enhancement of understanding of the general background of the invention and should not be taken as an acknowledgement or any form of suggestion that this information forms the prior art already known to a person skilled in the art.

SUMMARY

Advantageously, the systems and methods detailed in the present disclosure address the shortcomings in the prior art detailed above.

The present disclosure provides systems and methods for lead generation among other applications. In the disclosed systems and methods, at least one content item is curated and distributed to a relevant population of users. This is done by forming a listing of a plurality of content items together with an access condition form. The listing and access condition form are presented to a user through a display.

The plurality of content items is a subset of content from a catalog of content items. The plurality of content items is curated from the catalog of content items to increase user engagement with at least one content item in the plurality of content items in order to promote distribution of the plurality of content items.

Each respective content item in the catalog of content items is associated with a corresponding resource allotment. Examples of such resource allotments are a value of the respective content item or a commission from distribution of the respective content item.

Moreover, each respective content item is associated with a corresponding source, such as a publication source. By retaining this corresponding source, the systems and methods of the present disclosure increase engagement between the user with such sources through the curated plurality of content items of the listing that is presented to the user.

Additionally, each respective content item is associated with a corresponding classification in a plurality of classifications. This allows for groupings of two or more content items for presentation in the plurality of content items.

Furthermore, each respective content item is associated with a corresponding plurality of content item access conditions defining conditions the user must satisfy in order to access the respective content item.

The listing of the plurality of content items presented via the display includes a first virtual bin and a second virtual bin. The first virtual bin includes each respective content item in the plurality of content items selected by the user, and the second virtual bin includes each respective content item in the plurality of content items that is not present in the first virtual bin. In this way, assigning of content items to either of the first virtual bin or the second virtual bin is mutually exclusive, in that the respective content item cannot be assigned to both the first virtual bin and the second virtual bin.

Additionally, the access condition form includes a set of prompts that is collectively produced from each corresponding plurality of content item access conditions associated with each respective content item that is present in the first virtual bin. When a selection of a respective content item of the second virtual bin from the user is detected, the respective content item is reassigned to the first virtual bin from the second virtual bin. From this, the access condition form is updated and the user is presented with an updated set of prompts from each corresponding plurality of content item access conditions associated with each respective content item that is present in the first virtual bin, which now includes the respective content item selected by the user. Accordingly, the user is asked to provide a plurality of responses to the updated set of prompts in order to satisfy each corresponding content item access condition in the corresponding plurality of content item access conditions associated with each respective content item that is present in the first virtual bin. Based on a determination that each content item access condition is in fact satisfied by the user, each content item in the first virtual bin is distributed to an address associated with the user. From this, the systems and methods of the present disclosure improve engagement between a population of users (e.g., the user of the client device, a publisher of a content item) and a catalog of content items. Moreover, the user is not burdened by having to submit multiple access conditions forms since the systems and methods of the present disclosure utilize a dynamically updated access condition form that updates based on the content items present in the first virtual bin. Moreover, such a system has advantageous applications for lead generation. One such advantage includes facilitating engagement and contact between a population of users, a provider of a content item, a third-party, or a combination thereof. Moreover, such a system provides an advantage of providing and distributing personalized content items to a user based on selections by a user and a wider variety of content items available to the system. Additionally, once an existing user receives a distribution of content items, the existing user does not have to provide additional information in order to receive additional content. From this, the retention and growth of interactions between population of users, the provider of the content item, the third-party, or the combination thereof.

One aspect of the present disclosure provides a method for curating and distributing at least one content item. The method includes presenting, via a display, a listing of a plurality of content items and an access condition form. The plurality of content items includes a first content item selected by a first user and a second content item selected by a second user from a catalog of content items. Each respective content item in the catalog of content items is associated with a corresponding resource allotment and a corresponding publication source, a corresponding classification in a plurality of classification, and a corresponding plurality of content item access conditions. Each content item in the plurality of content items is associated the corresponding classification in the plurality of classifications of the first content item. Moreover, the listing of the plurality of content items includes a first virtual bin that provides a corresponding graphical description for each respective content item in the plurality of content items selected by the first user. The listing of the plurality of content items further includes a second virtual bin that provides the corresponding graphical description for each respective content item in the plurality of content items that is both associated with a content item in the first virtual bin and not present in the first virtual bin. Additionally, the access condition form includes an initial set of prompts collectively produced from each corresponding plurality of content item access conditions associated with each respective content item in the first virtual bin. The method includes detecting, responsive to the presenting the plurality of content items, a selection by the first user of a respective content item of the second virtual bin. Furthermore, the method includes upon detecting the selection by the first user of a respective content item of the second virtual bin, reassigning the respective content item from the second virtual bin to the first virtual bin. Accordingly, the method includes updating and presenting, based on the detecting the selection of the respective content item, via the display, the access condition form by updating the initial set of prompts to an updated set of prompts. The updated set of prompts is collectively produced from the corresponding plurality of content item access conditions associated with each respective content item in the first virtual bin after the reassigning the respective content item. The method includes receiving, from the first user, a plurality of responses to the updated set of prompts. The plurality of responses satisfies each corresponding content item access condition in the corresponding plurality of content item access conditions associated with each respective content item in the first virtual bin after the reassigning the respective content item. Furthermore, the method includes distributing, in accordance with a determination that each content item access condition in the corresponding plurality of content item access conditions associated with each respective content item in the first virtual bin is satisfied by the plurality of responses, each content item in the first virtual bin of the detecting the selection of the respective content item to an address associated with the first user, thereby curating and distributing the at least one content item.

In some embodiments, the method further includes repeating the detecting the section of the respective content item, the reassigning the respective content item, and the updating and presenting the access the condition form one or more times for each successive content item in the second virtual bin selected by the first user.

In some embodiments, the catalog of content items includes a plurality of media content items and a plurality of promotional content items.

In some embodiments, the plurality of media content items includes a written educational media content item.

In some embodiments, the corresponding resource allotment is fulfilled by the first user.

In some embodiments, the corresponding plurality of content item access conditions includes a first content item access condition associated with a threshold resource allotment fulfilled by the first user.

In some embodiments, the corresponding plurality of content item access conditions associated with the respective content item includes one or more privacy policy access conditions, one or more terms of agreement access conditions, one or more requests for personal identifying information, or a combination thereof.

In some embodiments, the second user is a publisher of the respective content item.

In some embodiments, the second user is a system administrator.

In some embodiments, the corresponding graphical description for each respective content item in the plurality of content items includes a value of the corresponding resource allotment of the respective content item, the corresponding publication source of the respective content item, an image of the respective content item, a summary of the respective content item, or a combination thereof.

In some embodiments, the catalog of content items includes at least 100 content items, at least 250 content items, at least 500 content items, at least 1,000 content items, at least 10,000 content items, or at least 100,000 content items.

In some embodiments, the plurality of content items includes 5 or less content items, 10 or less content items, or 15 or less content items.

In some embodiments, the address associated with the first user is an electronic mailing address.

In some embodiments, the address associated with the first user is a physical mailing address.

In some embodiments, the updating and presenting the access condition form further includes reassigning a third content item from the catalog to the plurality of content items, thereby reassigning the third content item to the second virtual bin.

Another aspect of the present disclosure is directed to providing a computer system for curating and distributing at least one content item. The computer system includes one or more processors, a display, and memory coupled to the one or more processors. The memory includes one or more programs configured to be executed by the one or more processors. The method includes presenting, via a display, a listing of a plurality of content items and an access condition form. The plurality of content items includes a first content item selected by a first user and a second content item selected by a second user from a catalog of content items. Each respective content item in the catalog of content items is associated with a corresponding resource allotment and a corresponding publication source, a corresponding classification in a plurality of classification, and a corresponding plurality of content item access conditions. Each content item in the plurality of content items is associated the corresponding classification in the plurality of classifications of the first content item. Moreover, the listing of the plurality of content items includes a first virtual bin that provides a corresponding graphical description for each respective content item in the plurality of content items selected by the first user. The listing of the plurality of content items further includes a second virtual bin that provides the corresponding graphical description for each respective content item in the plurality of content items that is both associated with a content item in the first virtual bin and not present in the first virtual bin. Additionally, the access condition form includes an initial set of prompts collectively produced from each corresponding plurality of content item access conditions associated with each respective content item in the first virtual bin. The method includes detecting, responsive to the presenting the plurality of content items, a selection by the first user of a respective content item of the second virtual bin. Furthermore, the method includes upon detecting the selection by the first user of a respective content item of the second virtual bin, reassigning the respective content item from the second virtual bin to the first virtual bin. Accordingly, the method includes updating and presenting, based on the detecting the selection of the respective content item, via the display, the access condition form by updating the initial set of prompts to an updated set of prompts. The updated set of prompts is collectively produced from the corresponding plurality of content item access conditions associated with each respective content item in the first virtual bin after the reassigning the respective content item. The method includes receiving, from the first user, a plurality of responses to the updated set of prompts. The plurality of responses satisfies each corresponding content item access condition in the corresponding plurality of content item access conditions associated with each respective content item in the first virtual bin after the reassigning the respective content item. Furthermore, the method includes distributing, in accordance with a determination that each content item access condition in the corresponding plurality of content item access conditions associated with each respective content item in the first virtual bin is satisfied by the plurality of responses, each content item in the first virtual bin of the detecting the selection of the respective content item to an address associated with the first user, thereby curating and distributing the at least one content item.

Yet another aspect of the present disclosure is directed to providing a non-transitory computer readable storage medium storing one or more programs. The one or more programs includes instructions, which when executed by a computer system cause the computers system to perform a method. The method includes presenting, via a display, a listing of a plurality of content items and an access condition form. The plurality of content items includes a first content item selected by a first user and a second content item selected by a second user from a catalog of content items. Each respective content item in the catalog of content items is associated with a corresponding resource allotment and a corresponding publication source, a corresponding classification in a plurality of classification, and a corresponding plurality of content item access conditions. Each content item in the plurality of content items is associated the corresponding classification in the plurality of classifications of the first content item. Moreover, the listing of the plurality of content items includes a first virtual bin that provides a corresponding graphical description for each respective content item in the plurality of content items selected by the first user. The listing of the plurality of content items further includes a second virtual bin that provides the corresponding graphical description for each respective content item in the plurality of content items that is both associated with a content item in the first virtual bin and not present in the first virtual bin. Additionally, the access condition form includes an initial set of prompts collectively produced from each corresponding plurality of content item access conditions associated with each respective content item in the first virtual bin. The method includes detecting, responsive to the presenting the plurality of content items, a selection by the first user of a respective content item of the second virtual bin. Furthermore, the method includes upon detecting the selection by the first user of a respective content item of the second virtual bin, reassigning the respective content item from the second virtual bin to the first virtual bin. Accordingly, the method includes updating and presenting, based on the detecting the selection of the respective content item, via the display, the access condition form by updating the initial set of prompts to an updated set of prompts. The updated set of prompts is collectively produced from the corresponding plurality of content item access conditions associated with each respective content item in the first virtual bin after the reassigning the respective content item. The method includes receiving, from the first user, a plurality of responses to the updated set of prompts. The plurality of responses satisfies each corresponding content item access condition in the corresponding plurality of content item access conditions associated with each respective content item in the first virtual bin after the reassigning the respective content item. Furthermore, the method includes distributing, in accordance with a determination that each content item access condition in the corresponding plurality of content item access conditions associated with each respective content item in the first virtual bin is satisfied by the plurality of responses, each content item in the first virtual bin of the detecting the selection of the respective content item to an address associated with the first user, thereby curating and distributing the at least one content item.

Other features and advantages of the invention will be apparent from, or are set forth in more detail in, the accompanying drawings, which are incorporated herein, and the following Detailed Description, which together serve to explain certain principles of exemplary embodiments of the present invention.

BRIEF DESCRIPTION OF THE DRAWINGS

FIGS. 4A and 4B collectively provide a flow chart of methods for curating and distributing a content item, in which dashed boxes represent optional elements in the flow chart, in accordance with an embodiment of the present disclosure;

FIGS. 6A, 6B, 6C, and 6D, collectively illustrate graphical user interfaces for presenting a listing of a plurality of content items, in accordance with an embodiment of the present disclosure;

FIGS. 6F, 6G, 6H, and 6I collectively illustrate graphical user interfaces for distributing a content item by presenting a digital report at a client device, in accordance with an embodiment of the present disclosure;

FIG. 7A illustrates a graphical user interface for engaging with a content item, in accordance with an embodiment of the present disclosure;

Figure 1:
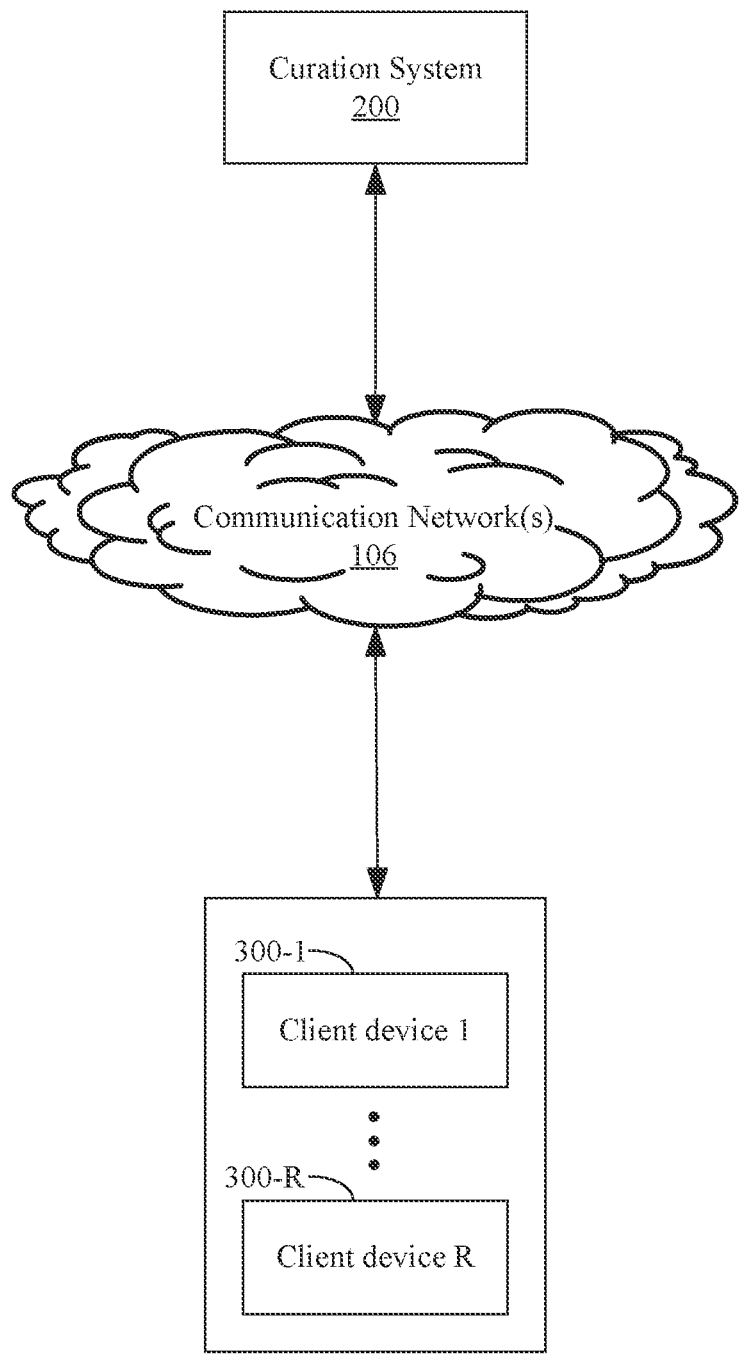
FIG. 1 illustrates an exemplary system topology including a curation system and a population of client devices, in accordance with an embodiment of the present disclosure.

In the figures, reference numbers refer to the same or equivalent parts of the present invention throughout the several figures of the drawing.

DETAILED DESCRIPTION

Systems and methods for curating and distributing content are provided. The systems and methods include presenting a listing of a plurality of content items and an access condition form. The plurality of content items is chosen from a catalog of content items, which stores various content items that are provided to and/or obtained by a curating system Each respective content item is associated with a corresponding resource allotment, source, classification, and a corresponding plurality of content item access conditions. These associations allow for the curation of particular content items to present to a user through the plurality of content items of the listing, in order to increase engagement of a population of users with the content items and/or the corresponding course of the content items. The listing of the plurality of content items includes a first virtual bin that includes some content items selected by the user, and a second virtual bin for each respective content item in the plurality of content items that is not in the first virtual bin, and thus not selected by the user. In this way, the first virtual bin and the second virtual bin provide a mutually exclusive partition of the plurality of content items.

The access condition form presented by the systems and methods of the present disclosure includes an initial set of prompts. Generally, a respective set of prompts of the access condition form is collectively produced from the corresponding plurality of content item access conditions that is associated with each respective content item that is currently present in the first virtual bin. Accordingly, upon detecting a selection of a respective content item of the second virtual bin, the respective content item is reassigned to the first virtual bin and the access condition form is updated and re-presented to the user based on the presence of the respective content item in the first virtual bin. From this, a plurality of responses to an updated set prompts that reflects the presence of the respective content item in the first virtual bin is then received from the respective user. Based on this, each content item in the first virtual bin is distributed to an address associated with the user, thereby curating and distributing the content items. In some embodiments, this distribution of each content item in the first virtual bin includes communicating a digital report to the address, which is configured to not only allow distribution of each content item in the first virtual bin, but also promote engagement between the user and a corresponding source associated with the respective content item in the first virtual bin by presenting a second content item through the digital report that is excluded from the plurality of content items. Accordingly, the digital report provides a unique opportunity to present one or more content items that have yet to be presented to the user through the listing of the plurality of content items, and further distribute the one or more content items that have yet to be presented to the user.

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

It will also be understood that, although the terms first, second, etc. may be used herein to describe various elements, these elements should not be limited by these terms. These terms are only used to distinguish one element from another. For instance, a first content item could be termed a second content item, and, similarly, a content item could be termed a first content item, without departing from the scope of the present disclosure. The first content item and the second content item are both content items, but they are not the same content item.

The terminology used in the present disclosure is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The foregoing description included example systems, methods, techniques, instruction sequences, and computing machine program products that embody illustrative implementations. For purposes of explanation, numerous specific details are set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions below are not intended to be exhaustive or to limit the implementations to the precise forms disclosed. Many modifications and variations are possible in view of the above teachings. The implementations are chosen and described in order to best explain the principles and their practical applications, to thereby enable others skilled in the art to best utilize the implementations and various implementations with various modifications as are suited to the particular use contemplated.

In the interest of clarity, not all of the routine features of the implementations described herein are shown and described. It will be appreciated that, in the development of any such actual implementation, numerous implementation-specific decisions are made in order to achieve the designer's specific goals, such as compliance with use case- and business-related constraints, and that these specific goals will vary from one implementation to another and from one designer to another. Moreover, it will be appreciated that such a design effort might be complex and time-consuming, but nevertheless be a routine undertaking of engineering for those of ordering skill in the art having the benefit of the present disclosure.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As used herein, the term "about" or "approximately" can mean within an acceptable error range for the particular value as determined by one of ordinary skill in the art, which can depend in part on how the value is measured or determined, e.g., the limitations of the measurement system. For example, "about" can mean within 1 or more than 1 standard deviation, per the practice in the art. "About" can mean a range of ±20%, ±10%, ±5%, or ±1% of a given value. Where particular values are described in the application and claims, unless otherwise stated, the term "about" means within an acceptable error range for the particular value. The term "about" can have the meaning as commonly understood by one of ordinary skill in the art. The term "about" can refer to ±10%. The term "about" can refer to ±5%.

As used herein, the term "dynamically" means an ability to update a program while the program is currently running.

Additionally, the terms "client," "subject," and "user" are used interchangeably herein unless expressly stated otherwise.

Furthermore, when a reference number is given an "$i^{th}$" denotation, the reference number refers to a generic component, set, or embodiment. For instance, a content item termed "content item i" refers to the $i^{th}$ content item in a plurality of content items (e.g., a first content item 214-1 in a plurality of content items 214).

In the present disclosure, unless expressly stated otherwise, descriptions of devices and systems will include implementations of one or more computers. For instance, and for purposes of illustration in FIG. 1, a client device 300 is represented as single device that includes all the functionality of the client device 300. However, the present disclosure is not limited thereto. For instance, the functionality of the client device 300 may be spread across any number of networked computers and/or reside on each of several networked computers and/or by hosted on one or more virtual machines at a remote location accessible across a communications network (e.g., communications network 106). One of skill in the art will appreciate that a wide array of different computer topologies is possible for the client device 300, and other devices and systems of the preset disclosure, and that all such topologies are within the scope of the present disclosure.

FIG. 1 illustrates an exemplary topography of a computing system 100 for curating a content item for a user and distributing the content item to the user. The computing system 100 includes a curating system (e.g., curating system 200 of FIG. 2) that facilitates curating a plurality of content items over a communication network(s) 106. One or more client devices (e.g., client device 300 of FIG. 3, client device 300 of FIG. 5, etc.) communicate with the curating system 200 through the communication network 106, such as communicating a selecting of a content item provided by a user of a client device 300. In this way, each client device 300 is associated with at least one user (e.g., a first client device 300-1 is associated with a first user, a second client device 300-2 is associated with a second user, a third client device 300-3 associated with a third user and a fourth user, etc.).

Figure 2:
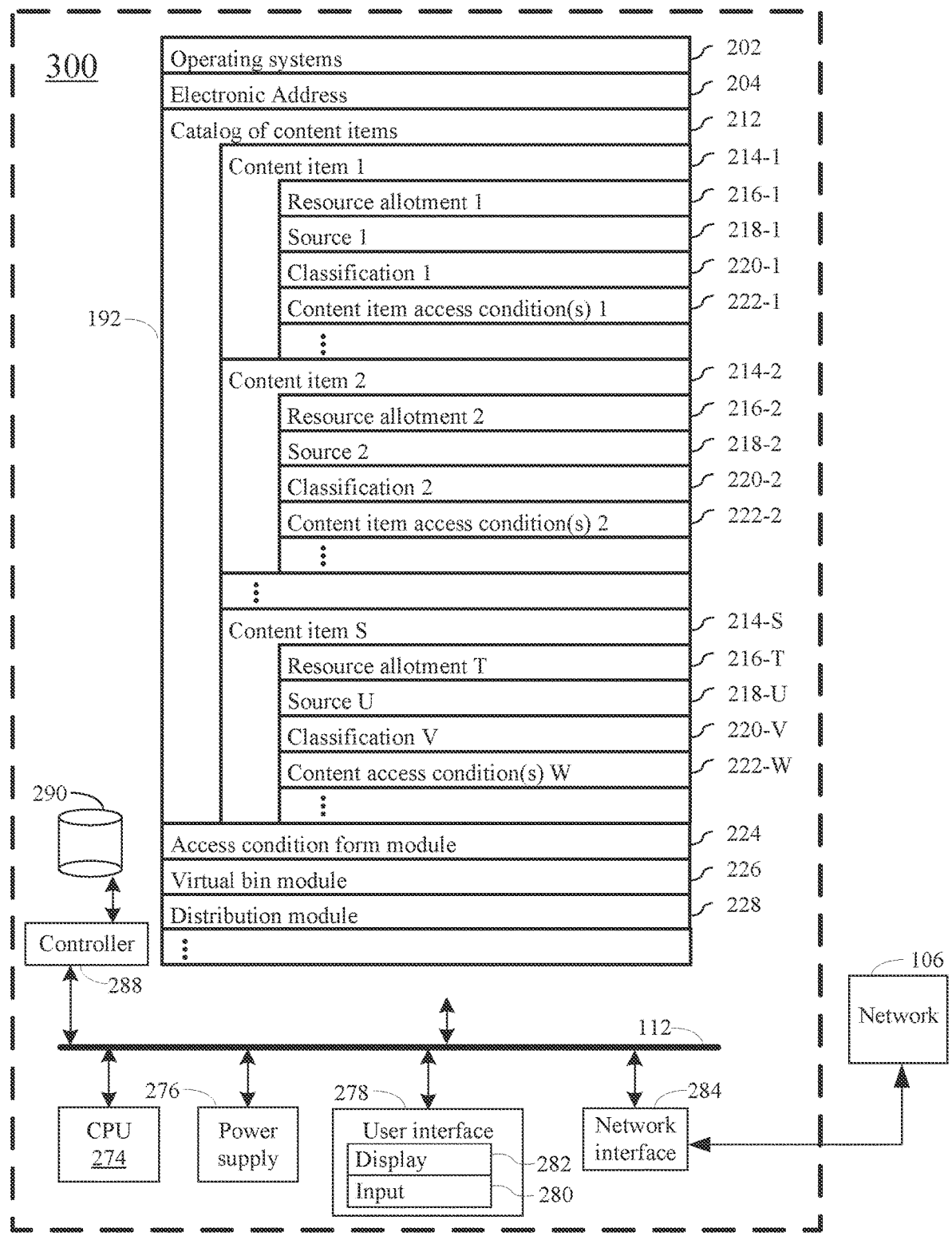
FIG. 2 illustrates various modules and/or components of a curation system, in accordance with an embodiment of the present disclosure.
Figure 3:
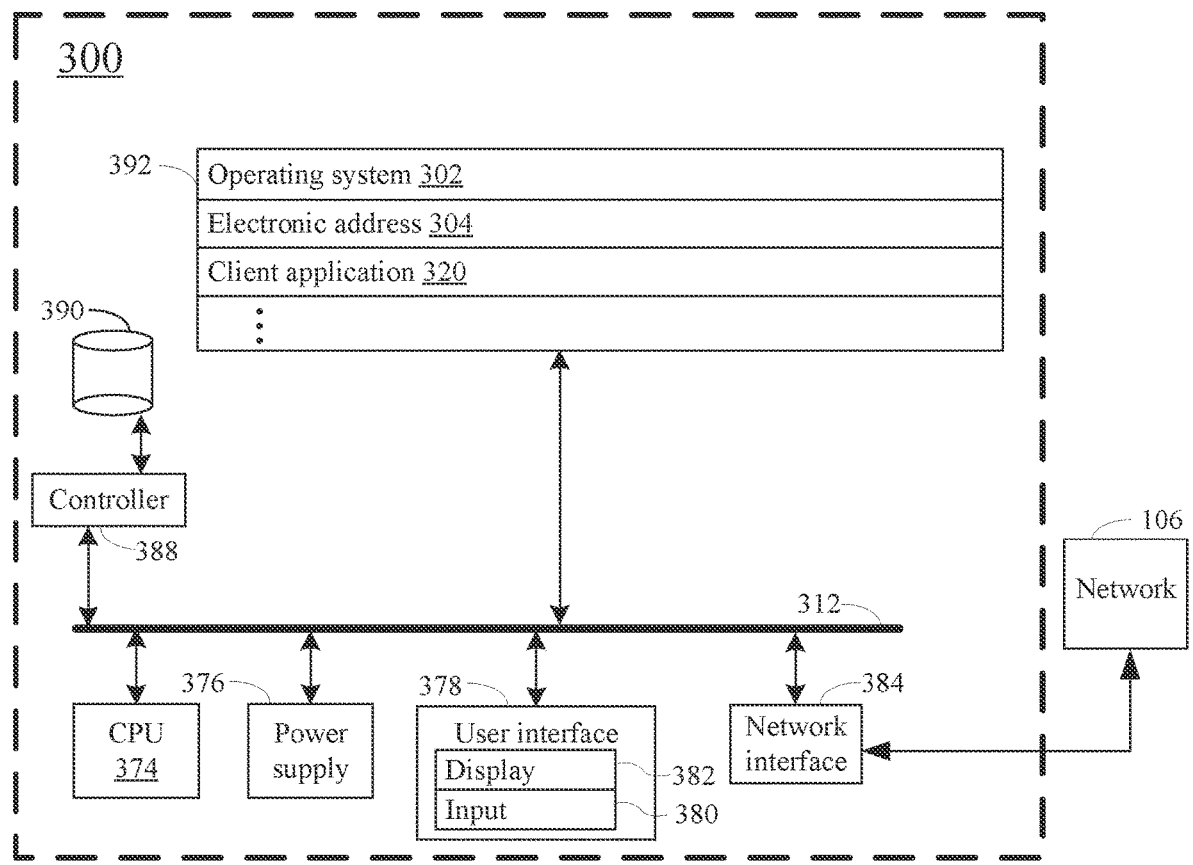
FIG. 3 illustrates various modules and/or components a client device, in accordance with an embodiment of the present disclosure.

A detailed description of a computing system 100 for curating and distributing content items in accordance with the present disclosure is described in conjunction with FIG. 1 through FIG. 3. As such, FIG. 1 through FIG. 3 collectively illustrate an exemplary topology of the computing system 100 in accordance embodiments of the present disclosure. The system 100 includes a curating system 200 for curating a plurality of content items by presenting content items that a user of a client device engages with. The curating system 200 utilizes one or more modules and/or components (e.g., catalog of content items 212, access condition form module 224, virtual bin module 226, distribution module 228) to curate the plurality of content items for the user and, optionally, distribute the plurality of content items.

Referring to FIG. 1, the curating system 200 is configured to curating a plurality of content items for a population of client devices 300. In some embodiments, the curating system 200 distributes a content item to a client device 300 across a communication network 106 that is retrieved from a remote device, such as a database and/or a server remote to the curating system 200 and/or the computing system 100. In this way, the content item is provided in electronic form from the curating system 200 (e.g., in an electronic structured format).

In some embodiments, the curating system 200 communicates a content item wirelessly through radiofrequency (RF) signals. In some embodiments, such signals are in accordance with an 802.11 (Wi-Fi), Bluetooth, or ZigBee standard.

In some embodiments, the curating system 200 is not proximate to a user and/or does not have wireless capabilities or such wireless capabilities are not used for the purpose of distributing a content item. In such embodiments, the communication network 106 is utilized to receive a data element from a source (e.g., first client device 300-1, second client device 300-2, . . . 300-R) to the curating system 200.

Examples of communication networks 106 include, but are not limited to, the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of the present disclosure.

Of course, other topologies of the computing system 100 other than the one depicted in FIG. 1 are possible. For instance, in some embodiments, rather than relying on a communications network 106, the one or more client devices 300 wirelessly transmit information directly to the curating system 200. Further, in some embodiments, the curating system 200 and/or the client device 300 constitutes a portable electronic device, a server computer, or in fact constitutes several computers that are linked together in a network, or be a virtual machine and/or a container in a cloud-computing context. As such, the exemplary topology shown in FIG. 1 merely serves to describe the features of an embodiment of the present disclosure in a manner that will be readily understood to one of skill in the art.

Turning to FIG. 2 with the foregoing in mind, in some embodiments, the curating system 200 includes one or more computers. For purposes of illustration in FIG. 2, the curating system 200 is represented as a single computer that includes all of the functionality for curating a content item and/or distributing the content item for a user at a client device 300. However, the present disclosure is not limited thereto. In some embodiments, the functionality for providing an curating system 200 is spread across any number of networked computers, and/or resides on each of several networked computers, and/or is hosted on one or more virtual machines and/or one or more containers at a remote location accessible across the communication network 106. One of skill in the art will appreciate that any of a wide array of different computer topologies are used for the application and all such topologies are within the scope of the present disclosure.

An exemplary curating system 200 for curating a content item and/or distributing the content item for a user at a client device 300 is provided. The curating system 200 includes one or more processing units (CPU's) 274, a network interface 284 or other communications interface, a memory 192 (e.g., random access memory), and one or more communication busses 112 for interconnecting the aforementioned components. In some embodiments, the curating system 200 includes a user interface 278 for visualizing and interacting with the aforementioned components and/or the communication network 106. In some embodiments, the user interface 278 includes a display 282 and an input 280 (e.g., keyboard, keypad, touch screen, etc.). In some embodiments, the memory 192 includes mass storage that is remotely located with respect to the central processing unit(s) 274. In other words, some data stored in the memory 192 may in fact be hosted on computers that are external to the curating system 200, but that can be electronically accessed by the curating system 200 over an Internet, intranet, or other form of network or electronic cable (illustrated as element 106 in FIG. 2) using network interface 284.

In some embodiments, the memory 192 of the curating system 200 for curating a content item and/or distributing the content item to a user at a client device 300 includes:
an operating system 202 that includes procedures for handling various basic system services;
an electronic address 204 that is associated with the curating system 200;
a catalog of content items 212 that includes stores a plurality of content items (e.g., first content item 214-1, second content item 214-2, . . . , content item S 214-S of FIG. 2), in which each respective content item 214 is associated with a corresponding resource allotment 216, a corresponding source 218, a corresponding classification 220, and a plurality of content item access conditions 222;
an access condition form module 224 for configuring an access condition form, updating the access condition form, presenting the access condition form for display at a client device 300, or a combination thereof (e.g., access condition form 620 of FIG. 6B, access condition form 620 of FIG. 7C, etc.);
a virtual bin module 226 that facilitates presenting and/or configuring at least two virtual bins (e.g., first virtual bin 610-1 of FIG. 6B, second virtual bin 610-2 of FIG. 7B, etc.); and
a distribution module 228 for facilitating distribution of one or more content items 214 and/or generating a digital report (e.g., digital report 750 of FIG. 6H, digital report 750 of FIG. 7G, etc.) that provides access to the one or more content items 214.

As illustrated in FIG. 2, the curating system 200 preferably includes an operating system 208 that includes procedures for handling various basic system services. The operating system 202 (e.g., iOS, ANDROID, DARWIN, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

An electronic address 204 is associated with the curating system 200, which is utilized to at least uniquely identify the curating system 200 from other devices and components (e.g., client device 300 of FIG. 1) of the computer system 100. By way of example, in some embodiments, the electronic address 204 associated with the curating system 200 is used to provide a source of a content item 214 distributed by the curating system 200 and/or indicate a destination for receiving one or more access conditions forms (e.g., access condition form 620 of FIG. 6B, access condition form 620 of FIG. 7D, etc.) and/or to identify a location for distributing a respective content item.

A catalog of content items 212 retains a plurality of content items 214 that is made available for distribution to a population of client devices 300. Each content item 214 provides information to a user in a readily coherent format, such as human readable text of an article or external web-based content, which allows for a user of a client device 300 to utilize and engage with the content item 214 at the client device 300. As a non-limiting example, in some embodiments, a respective content item 214 is a media content item 214 that presents information to the user, such as the human readable text or audio including coherent utterances. For instance, in some embodiments, a content item 214 includes a media file, such as a video file (e.g., .MPEG, .WMV, etc.) and/or an audio file (e.g., .WAV, .MP3, etc.). In some embodiments, the content item 214 includes a client application (e.g., client application 320) for utilizing with the client device 300, such as a video game client application 320 or a securities trading client application (e.g., second content item 214-2 of FIG. 7B). In some embodiments, the content item 214 includes an electronic literature, such as an electronic article or scholarly literature. In such embodiments, the content item 214 can be a written educational media content item 214 (e.g., sourced 218 from a second user that authored the educational medical content item 214). As such, the content item 214 is a digital content item 214 that provides a mechanism to promote the first user of the client device 300 to engage with the content item 214 and/or a corresponding source 218 of the content item 214 through the user interface 278 of the client device 300.

In this way, the catalog of content items 212 facilitates storing a number content items 214. For instance, in some embodiments, the catalog of content items 122 includes at least 5 content items 214, at least 10 content items 214, at least 20 content items 214, at least 40 content items 214, at least 50 content items 214, at least 75 content items, at least 100 content items 214, at least 175 content items, at least 250 content items 214, at least 500 content items 214, at least 1,000 content items 214, at least 2,500 content items 214, at least 10,000 content items 214, at least 100,000 content items 214, at least 200,000 content items, or a combination thereof. Moreover, in some embodiments, the plurality of content items 214 that is presented to a respective user includes 1 content item 214, 2 content items, about 4 content items 214 (e.g., 3 content items 214), about 7 content items (e.g., six content items 214), about 9 content items, about 10 content items, about 13 content items, about 15 content items or a combination thereof. In some embodiments, the plurality of content items 214 is limited to no more than 4 content items 214, no more than 5 content items 214, no more than 7 content items 214, no more than 10 content items 214, or a combination thereof. In this way, the plurality of content items 214 that is presented to a respective user is a subset of content items 214 from the catalog of content items 212. Accordingly, in some embodiments, the plurality of content items 214 includes a portion that is less then all of the content items 214 in the catalog of content items 212. From this, the curating system is able to curate the plurality of content items 214 that is tailored to a respective user, such as tailoring the plurality of content items 214 based on a selection of a first content item 214-1 by the respective user (e.g., block 504 through block 508 of FIG. 5, block 530 of FIG. 5).

Figure 5:
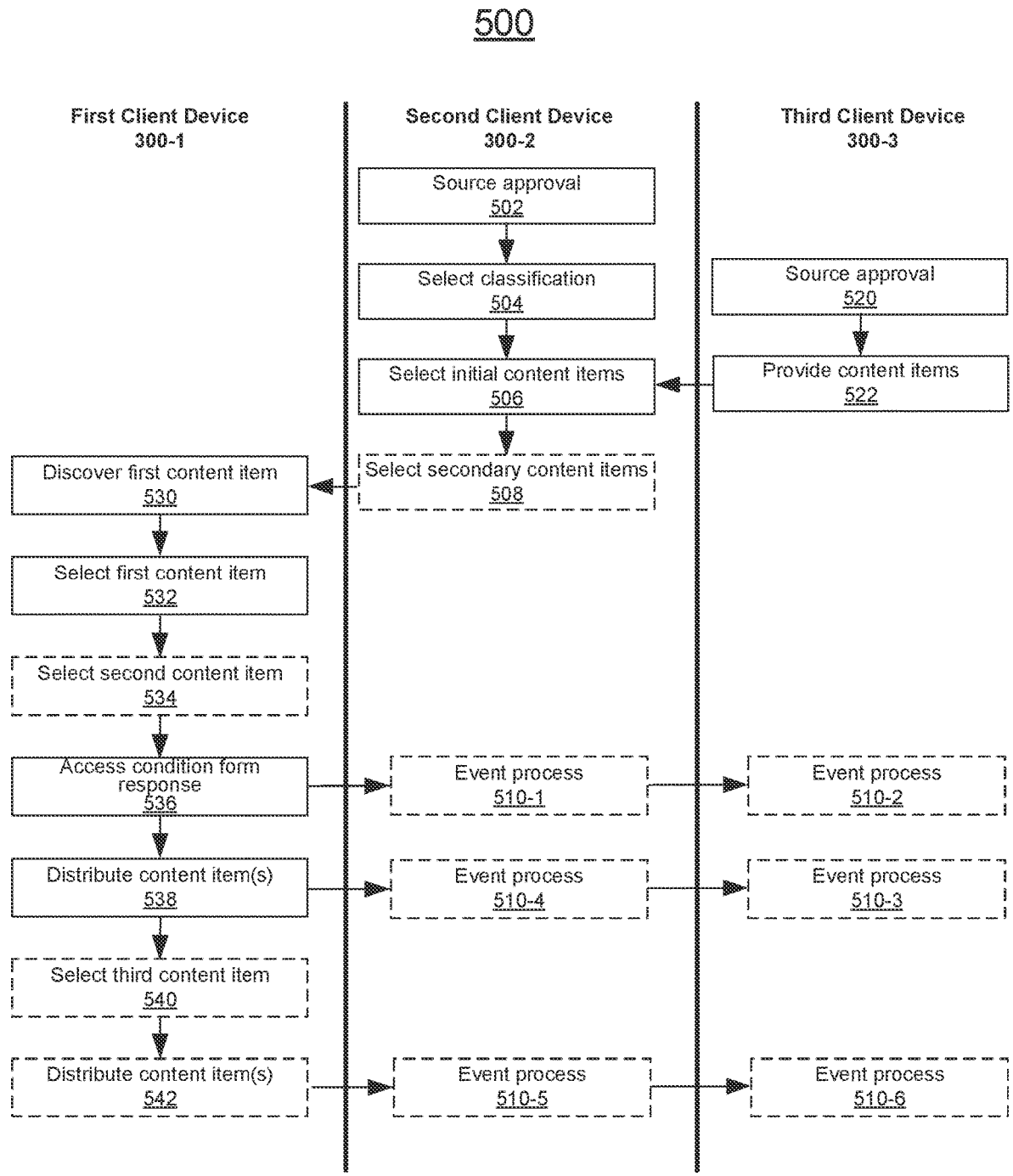
FIG. 5 provides another flow chart for methods for curating and distributing a content item, in which dashed boxes represent optional elements in the flow chart, in accordance with an embodiment of the present disclosure.

In some embodiments, the curating system 200 receives one or more content items 214 from a client device 300, which is then stored by the curating system 200 in the catalog of content items 212 (e.g., block 522 of FIG. 5). By way of example, in some embodiments, a first user of a first client device 300-1 communicates with the curating system 200 by engaging with a first content item 214-1 presented by the curating system 200 (e.g., block 530 of FIG. 5) and a second user (e.g., second client device 300-2 of FIG. 5, third client device 300-3 of FIG. 3) prior to the first user communicating with the curating system 200, provides the first content item 214-1 to the curating system 200 for presentation to a population of users that includes the first user (e.g., block 522 of FIG. 5).

Each respective content item 212 in the catalog of content items 212 includes a corresponding resource allotment 216. Referring briefly to FIG. 5, in some embodiments, the corresponding resource allotment 216 is defined by a second user (e.g., user of second client device 300-2 of FIG. 5, user of third client device 300-3 of FIG. 5). The second user is allowed to modify the corresponding resource allotment 216 in accordance with a desire of the second user, such as in response to a demand in a market for the respective content item 214 associated with the corresponding resource allotment 216. Typically, this corresponding resource allotment 216 must be fulfilled by a respective user in order to access a respective content item 214 (e.g., block 536 of FIG. 5). However, in alternative embodiments, the corresponding resource allotment 216 is negated or subsidized by a corresponding source 218 associated with the respective content 214, in order to promote distribution of the respective content item 214 and/or engagement between the respective user and the corresponding source 218 (e.g., block 510 of FIG. 5). For instance, referring to briefly to FIG. 6D, a second content item 214-2 is described as having a corresponding resource allotment 216 of $19.99 which has been entirely comped (negated to free) for the respective user, such that the respective user is not required to fulfill the corresponding resource allotment 216 of the respective content item 214. However, the present disclosure is not limited thereto.

Each respective content item 214 is associated with a corresponding classification 220 in a plurality of classifications 220. Each classification 220 in the plurality of classifications 220 provides a unique grouping of at least two content items 214 in the catalog of content items 212. In some embodiments, a respective classification 220 is defined by a user of the curating system 200, such as a system administrator of the curating system 200. By way of example, the user of the curating system 200 can define a first classification 220-1 in a plurality of classifications 220 as a grouping of each content item 214 of the catalog of content items 212 that is associated with a blockchain technology and a second classification 220-2 in the plurality of classifications 220 as a grouping of each content item 212 of the catalog of content items 212 that is associated with a commodities industry. In this way, when a new content item 214 is provided to the curating system (e.g., block 522 of FIG. 5), the new content item can be classified into a respective classification 220 that has been defined by the user of the curating system 200. By having the user of the curating system 200 define the respective classification 220, a corresponding source 218 of the respective content item 214 is not burdened with having to perform this defining. Moreover, the user of the curating system 200 can provide uniformity to the plurality of classifications 220 in order to prevent redundant or irrelevant classifications 220 that can occur when more than one user defines a respective classification 220. However, the present disclosure is not limited thereto.

In alternative embodiments, the respective classification 220 in the plurality of classifications 220 is defined by a second user (e.g., second client device 300-2 of FIG. 5) that is unassociated with both of the first user of a client device 300 that engages with the curating system 200 to obtain access to a first content item 214-1 (e.g., blocks 530 through 542 of FIG. 5, method 400 of FIGS. 4A and 4B, etc.) and a corresponding source 218 of the first content item 214-1. As a non-limiting example, consider the first user of a client device 300 (e.g., first client device 300-1 of FIG. 5) that engages with the curating system 200 to obtain access to first content item 214-1 in the catalog of content items 212 (e.g., block 530 of FIG. 5), the second user (e.g., second client device 300-2 of FIG. 5) that is a corresponding source of a second content item 214-2 in the catalog of content items 212 (e.g., block 522 of FIG. 5), and a third user (e.g., third client device 300-3 of FIG. 5) that is the corresponding source of the first content item 214-1 in the catalog of content items 212 (e.g., block 522 of FIG. 5). Accordingly, the second user can define a first classification 220-1 (e.g., block 504 of FIG. 5) that includes the second content item 214-2 and select the first content 214-1 for inclusion in the first classification 220-1 (e.g., block 506 of FIG. 5).

For instance, referring briefly to FIG. 5, in some embodiments, a user of a client device 300 (e.g., second user of second client device 300-2 of FIG. 5) defines a respective classification 220 and, optionally, provides a first content item 214-1 for inclusion in the respective classification 220. Accordingly, the user of the client device 300 can select (e.g., block 506 of FIG. 5, block 508 of FIG. 5) additional content items 214 stored by the catalog of content items 212 (e.g., block 522 of FIG. 5) for inclusion in the respective classification 220.

As yet another non-limiting example, referring briefly to FIG. 5, in some embodiments, the curating system 200 receives a request from one or more client devices 300, such as a second client device 300-2 associated with a first content item source 218-1 (e.g., a publisher) and a third client device 300-3 associated with a second content item source 218-2 (e.g., an advertiser). In such embodiments, the curating system 200 determines if the second client device 300-2 and/or the third client device 300-3 is authorized (e.g., blocks 502, 520) to either provide (e.g., block 522) one or more content items 214 for the catalog of content items 212, which can then be distributed to a first client device associated 300-1 with a first user. Upon approval (e.g., blocks 502, 520), in such embodiments, the second client device 300-2 can define a classification 220 or select (e.g., block 504) the classification 220 from one or more predetermined classifications 220. This classification 220 will form the basis for determining a plurality of content items 214 to present to the first client device 300. For instance, the second client device 300 can select (e.g., block 504) a first classification 220-1 associated with cryptocurrencies and then select (e.g., block 506) one or more content items 214 for inclusion in the first classification 220-1. The one or more content items 214 of the first classification 220-1 can be provided by the second client device 300-2, the third client device 300-3 (e.g., block 522) or the curating system 200. In some embodiments, the second client device 300-2 selects an initial plurality of content items (e.g., block 404 of FIG. 4A) that are presented to a first user, and a secondary plurality of contents 214 ((e.g., blocks 508, 540) that is presented in accordance with a determination that a content item 214 in the initial plurality of content items 214 is distributed to the first user (e.g., block 538).

For instance, in some embodiments, the corresponding resource allotment 216 of the respective content item 214 is fulfilled by a second user or by the curating system 200. In such embodiments, the corresponding resource allotment 216 can be a distribution of resources to the second user associated with a corresponding source 218 of the respective content item 214 in accordance with a determination that the respective content item 214 is distributed to a first user (e.g., block 414 of FIG. 4B, block 510 of FIG. 5). In this way, the second user is encouraged to curate a plurality of content items 214 for a first user that maximizes a number of content items 214 distributed to the first user (e.g., block 538 of FIG. 5, block 542 of FIG. 5) in order to further increase the corresponding resource allotment 216 that is distributed to the second user (e.g., block 510 of FIG. 5, block 414 of FIG. 4B, etc.).

Each respective content item 214 of the catalog of content items 212 is associated with a corresponding source 218 of the content item 214. In typical embodiments, the corresponding source 218 of a respective content item 214 is a corresponding publication source of the respective content item 214, such as an author of the respective content item 214, a publisher of the respective content item 214, an owner of the respective content item 214, or a combination thereof (e.g., block 522 of FIG. 5). By storing the corresponding source 218 for each respective content item 212, engagement between a population of users and the corresponding source 218 increases, not only through the presence of the association between the corresponding source 218 and the respective content item 214 that can be presented to a user but also by curating at least two content items 214 that are associated with the same corresponding source 218. Moreover, by storing the corresponding source 218 for each respective content item 212, the curating system 200 can facilitate communicating event processes (e.g., block 510 of FIG. 5) to a client device 300 associated with the corresponding source 22, such as communicating an authorization for distribution of a respective content item 214 to an address associated with a user (e.g., electronic address 304 of FIG. 3, block 510-1 of FIG. 5, block 510-2 of FIG. 5, block 414 of FIG. 4B, etc.)

Additionally, in some embodiments each respective content item 214 includes a corresponding one or more content item access conditions 222. In some embodiments each respective content item 214 includes a corresponding plurality of content item access conditions 222. Each respective content item access condition 222 in the corresponding one or more of content item access conditions 222 defines a condition a respective user must satisfy in order to gain access to a respective content item 214, such as receiving a distribution of the respective content item 214 (e.g., block 414 of FIG. 4B). In some embodiments, a corresponding plurality of content item access conditions 222 is defined by the corresponding source 218 of the respective content item 214, which allows the corresponding source 218 control over distribution of the respective content item 214. In some embodiments, the corresponding plurality of content item access conditions 222 is defined by a second user of the computer system 100 that is unassociated with the corresponding source 218 of the respective content item 214, such as a system administrator of the curating system 200.

An access condition form module 224 facilities generating an access condition form (e.g., access condition form 620 of FIG. 6D, access condition form 620 of FIG. 7B, etc.), presenting the access condition form 210 for display at a respective client device 300 (e.g., block 404 of FIG. 4A, block 410 of FIG. 4A), and updating the access condition form 210 for display at the respective client device 300 (e.g., block 410 of FIG. 4A). Each access condition form 620 includes one or more prompts (e.g., prompts 622 of FIG. 6B, prompts 622 of FIG. 7C, etc.) that is configured to induce a response from a respective user of a client device 300. Each prompt 622 is presented such that the response provided by the respective user of the client device 300 satisfies a corresponding content access condition that is associated with a respective prompt 622. In this way, the access condition form module 224 communicates with a virtual bin module 226 and/or the catalog of content items 212 in order to produce the one or more prompts 622 from the corresponding plurality of content item access conditions 222 associated with each respective content item 214 of a corresponding bin (e.g., first virtual bin 610-1 of FIG. 6B, first virtual yin 610-1 of FIG. 7B).

A virtual bin module 226 facilitates generating and presenting at least two virtual bins 610 for display at a respective client device 300. By generating the at least two virtual bins 610, the virtual bin module 226 can assign a respective content item 214 to a bin 610 in the at least two virtual bins 610. For instance, in some embodiments, the virtual bin module 226 detects a first user of a client device 300 engaging with a respective content item 214 in a plurality of content items 214 of a listing presented to the first user of via a display of the client device 300.

A distribution module 228 allows the curating system 200 to provide access and/or distribute at least one content item 214 to a first user of a first client device 300-1. By providing access to the at least one content item 214, the curating system 200 communicates with a second user of a second client device 300-2 and/or the source 218 of the at least one content item 214, which then ultimately distributes the at least one content item 214 to the first user. By having the second user of the second client device 300-2 and/or the corresponding source 218 of the at least one content item 214 distribute the at least one content item 214, engagement between the first user and the second user and/or the corresponding source 218 increases via this newly opened distribution channel. However, the present disclosure is not limited thereto. In alternative embodiments, the distribution module 228 distributes the at least one content item 214 directly to first user of the first client device 300-1. For instance, in some embodiments, the distribution module 228 generates a digital report (e.g., digital report 750 of FIG. 6H, digital report 750 of FIG. 7H) that includes the one or more content items 214.

Furthermore, in some embodiments, one or more of the above identified data stores and/or modules of the curating system 200 is stored in one or more of the previously described memory devices (e.g., memory 192), and correspond to a set of instructions for performing a function described above. The above-identified data, modules, or programs (e.g., sets of instructions) need not be implemented as separate software programs, procedures, or modules. Thus, various subsets of these modules may be combined or otherwise re-arranged in various implementations. In some implementations, the memory 192 optionally stores a subset of the modules and data structures identified above. Furthermore, in some embodiments the memory 192 stores additional modules and data structures not described above.

Referring to FIG. 3, a description of an exemplary client device 300 (e.g., first client device 300-1) that can be used with the present disclosure is provided. In some embodiments, a client device 300 includes a smart phone (e.g., an iPhone, an Android device, etc.), a laptop computer, a tablet computer, a desktop computer, a wearable device (e.g., a smart watch, a smart garment, a heads-up display (HUD) device, etc.), a television (e.g., a smart television), or another form of electronic device such as a gaming console, a stand-alone device, and the like. However, the present disclosure is not limited thereto.

The client device 300 illustrated in FIG. 3 has one or more processing units (CPU's) 374, a network or other communications interface 384, a memory 392 (e.g., random access memory), a user interface 378, the user interface 378 including a display 382 and an input 380 (e.g., keyboard, keypad, touch screen, etc.), a power supply 376, one or more communication busses 312 for interconnecting the aforementioned components, or a combination thereof.

In some embodiments, the user interface 378, the display 382, the input 380, or a combination is as described with respect to the corresponding user interface 278, the corresponding display 282, the corresponding input 280, or the combination thereof of the curating system 200. For instance, in some embodiments, the input 380 of the client device 300 is a touch-sensitive display 382, such as a touch-sensitive surface. In some embodiments, the user interface 378 includes one or more soft keyboard embodiments. In some embodiments, the soft keyboard embodiments include standard (QWERTY) and or non-standard configurations of symbols on the displayed icons. The input 380 and/or the user interface 378 is utilized by an end-user of the respective client device 300 (e.g., a respective subject) to input various commands (e.g., a push command) to the respective client device 300.

It should be appreciated that the client device 300 illustrated in FIG. 3 is only one example of a multifunction device that may be used with the present disclosure. Thus, a client device 300 optionally has more or fewer components than shown, optionally combines two or more components, or optionally has a different configuration or arrangement of the components. The various components shown in FIG. 3 are implemented in hardware, software, firmware, or a combination thereof, including one or more signal processing and/or application specific integrated circuits.

Memory 392 of the client device 300 illustrated in FIG. 3 optionally includes high-speed random-access memory and optionally also includes non-volatile memory, such as one or more magnetic disk storage devices, flash memory devices, or other non-volatile solid-state memory devices.

In some embodiments, the network interface 384 converts electrical signals to from electromagnetic signals and communicates with network 106 and other communications devices, client devices 300 (e.g., a second client device 300-2, client device R 300-R, etc.), and/or the curating system 200 via the electromagnetic signals. The network interface 384 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The network interface 384 optionally communicates with the network 106. In some embodiments, the network interface 384 does not include RF circuitry and, in fact, is connected to the communication network 106 through one or more hard wires (e.g., an optical cable, a coaxial cable, or the like).

In some embodiments, the memory 392 of the client device 300 stores:
  an operating system 302 that includes procedures for handling various basic system services;

an electronic address 304 associated with the client device 300; and a client application 320 for communicating a selection of a respective content item and/or an access condition form to a curating system 200.

As illustrated in FIG. 3, a client device 300 preferably includes an operating system 302 that includes procedures for handling various basic system services. The operating system 302 (e.g., iOS, ANDROID, DARWIN, RTXC, LINUX, UNIX, OS X, WINDOWS, or an embedded operating system such as VxWorks) includes various software components and or drivers for controlling and managing general system tasks (e.g., memory management, storage device control, power management, etc.) and facilitates communication between various hardware and software components.

An electronic address 304 is associated with each client device 300, which is utilized to at least uniquely identify a client device 300 from other devices and components of the system 100. In some embodiments, the client device 300 includes a serial number, and optionally, a model number or manufacturer information that further identifies the client device 300. In some embodiments, the electronic address 304 associated with the client device 300 is used to provide a source of the client device 300 that engages with a respective content item 214 or to receive a distribution of the respective content item 214 from a curating system 200.

Figure 6A:
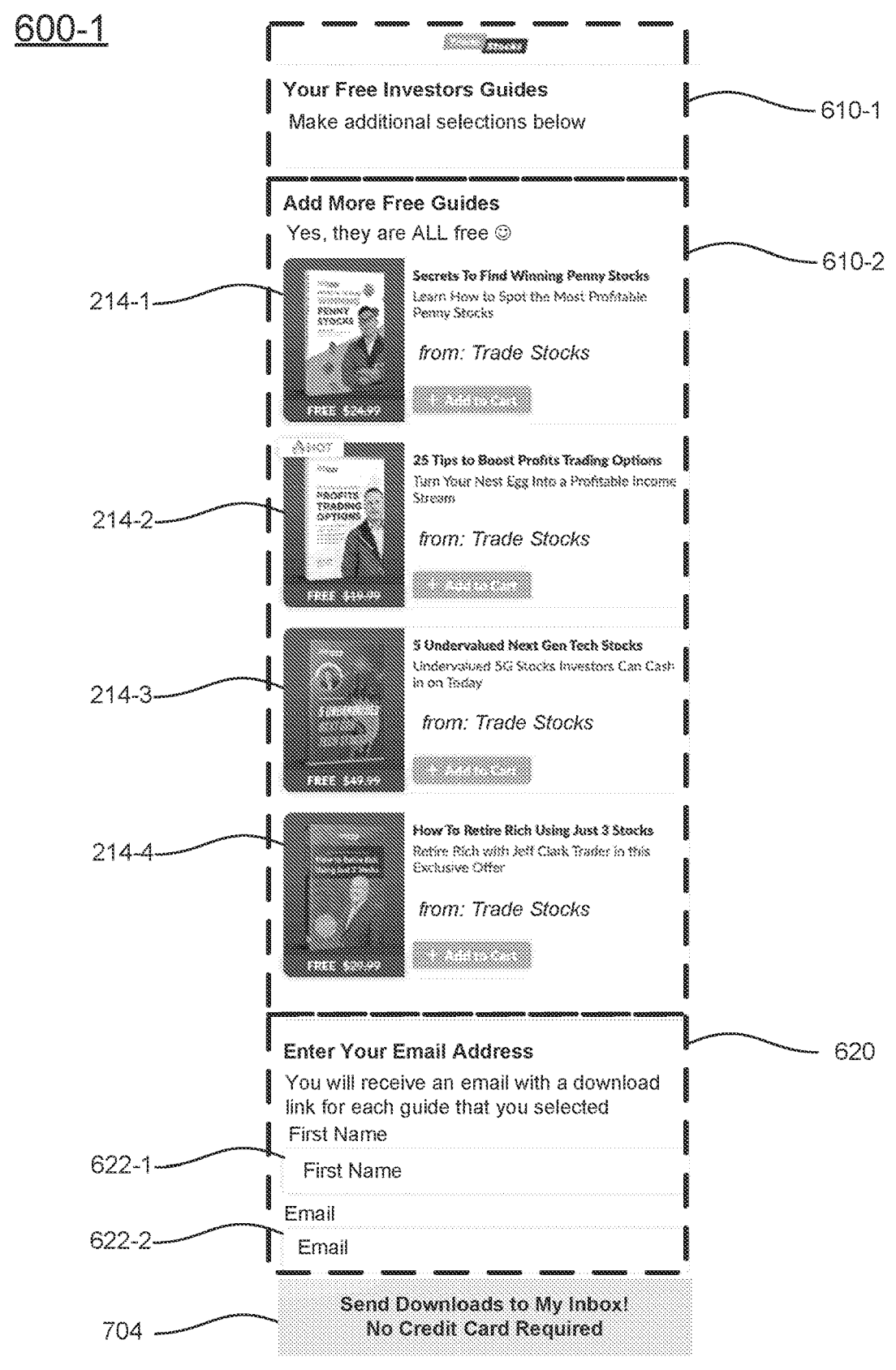
Figure 6C:
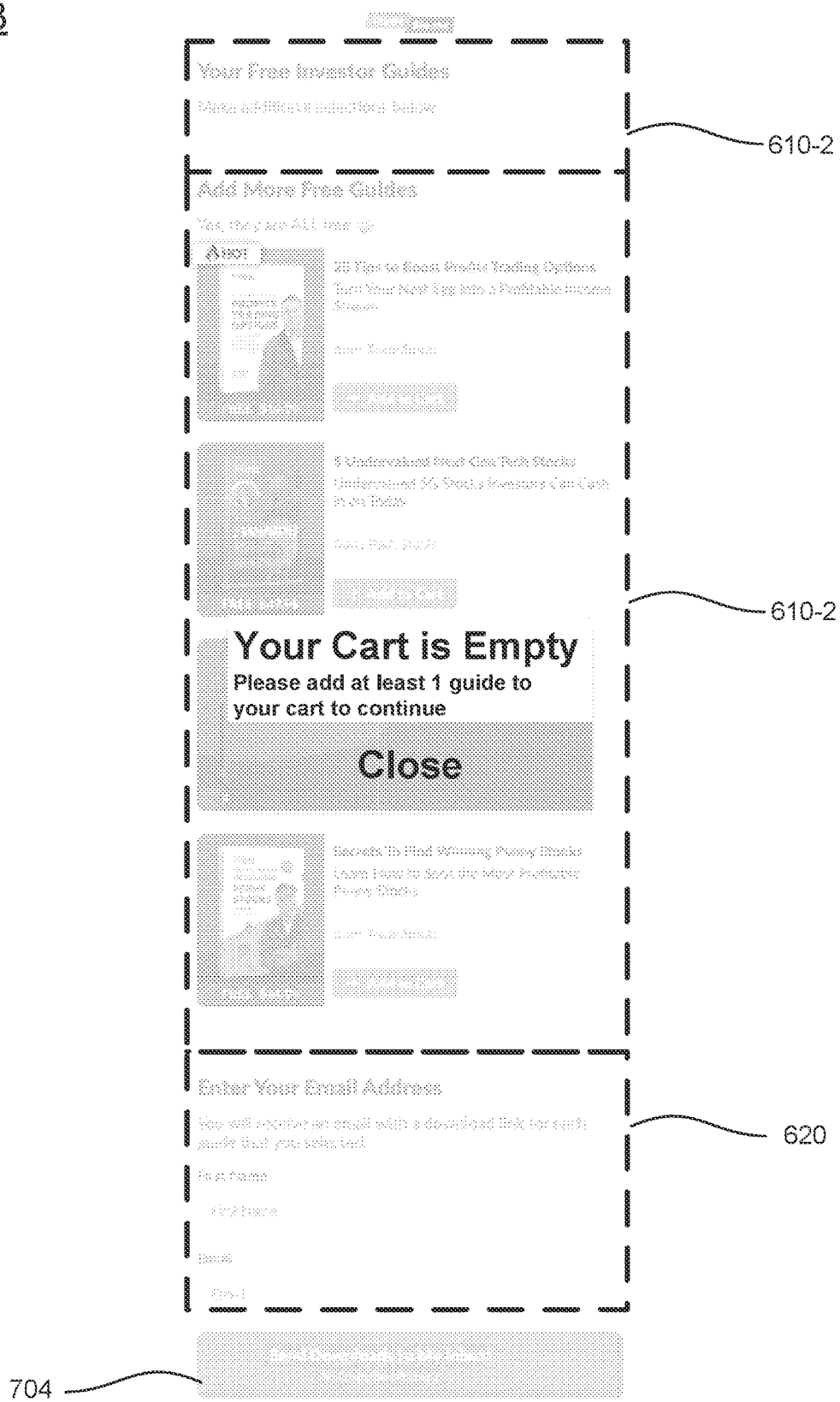
Figure 6E:
FIG. 6E illustrates a graphical user interface for confirming a distribution of a content item to an address of a user, in accordance with an embodiment of the present disclosure.
Figure 7B:
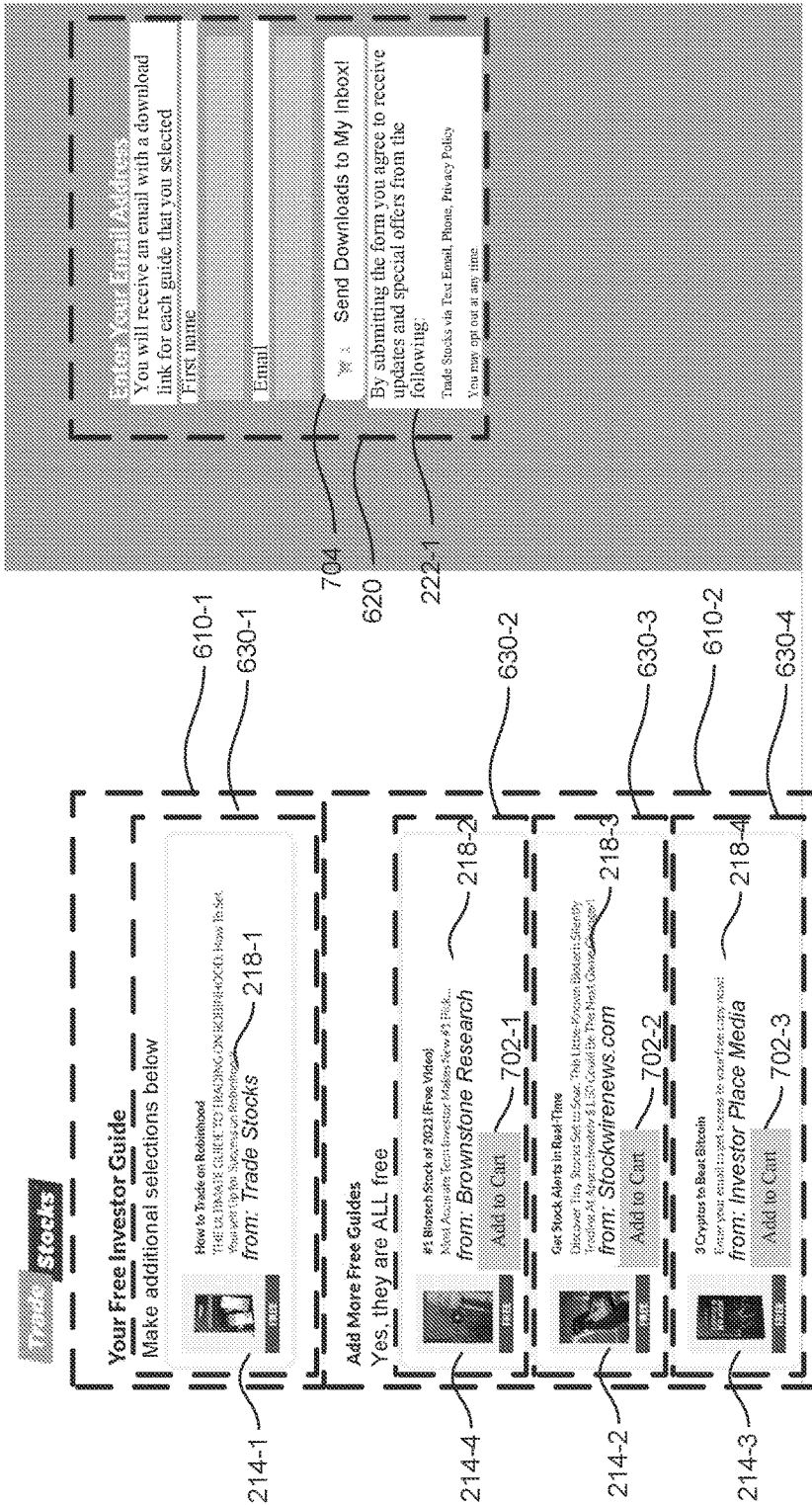
FIGS. 7B, 7C, and 7D, collectively illustrate graphical user interfaces for presenting another listing of a plurality of content items, in accordance with an embodiment of the present disclosure.
Figure 7C:
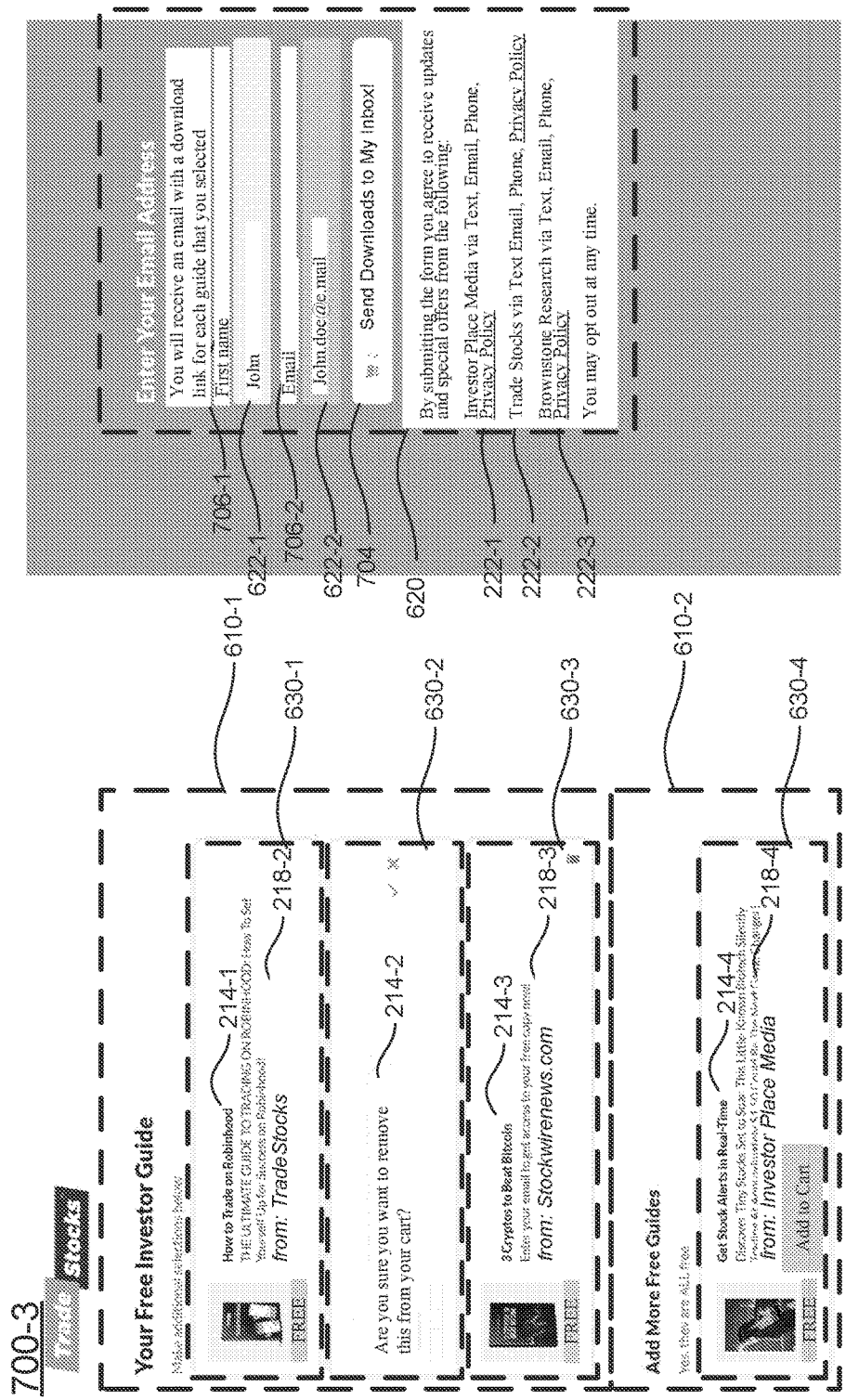

A client application 320 is a group of instructions that, when executed by a processor (e.g., CPU(s) 274), generates content (e.g., a visualization of a listing of a plurality of content items 605 provided by the curating system 200 on the display 382 of the client device 300 of FIG. 3; user interface 600-1 of FIG. 6A; user interface 700-3 of FIG. 7C; etc.) for presentation to a user of the client device 300. In some embodiments, the client application 320 generates content in response to one or more inputs received from the user through the user interface 378 of the client device 300. For instance, in some embodiments, the client application 320 includes a data presentation application for viewing the contents of a file or web application that includes a listing of a plurality of content items 214 curated for the user.

In some embodiments, the client device 300 has any or all of the circuitry, hardware components, and software components found in the system depicted in FIG. 3. In the interest of brevity and clarity, only a few of the possible components of the client device 300 are shown to better emphasize the additional software modules that are installed on the client device 300.

Now that details of a computing system 100 for curating a content item and/or distributing the content item to a user of a client device have been described, details regarding a flow chart of processes and features for implementing a method for curating a content item and/or distributing a content item (e.g., method 400 of FIGS. 4A and 4B, method 500 of FIG. 5), in accordance with an embodiment of the present disclosure, are disclosed with reference to FIGS. 4A and 4B.

Block 402. Referring to block 402, a method 400 is provided. The method 400 curates at least one content item (e.g., content item 214 of FIG. 2) for a first user, such as a first user of a client device (e.g., client device 300 of FIG. 3, first client device 300-1 of FIG. 5). Moreover, in some embodiments, the method 400 further distributes the at least one content item 214 to the first user of the client device 300 by providing the first user with access to the at least one content item 214 (e.g., block 538 of FIG. 5, block 542 of FIG. 5).

Figure 7D:
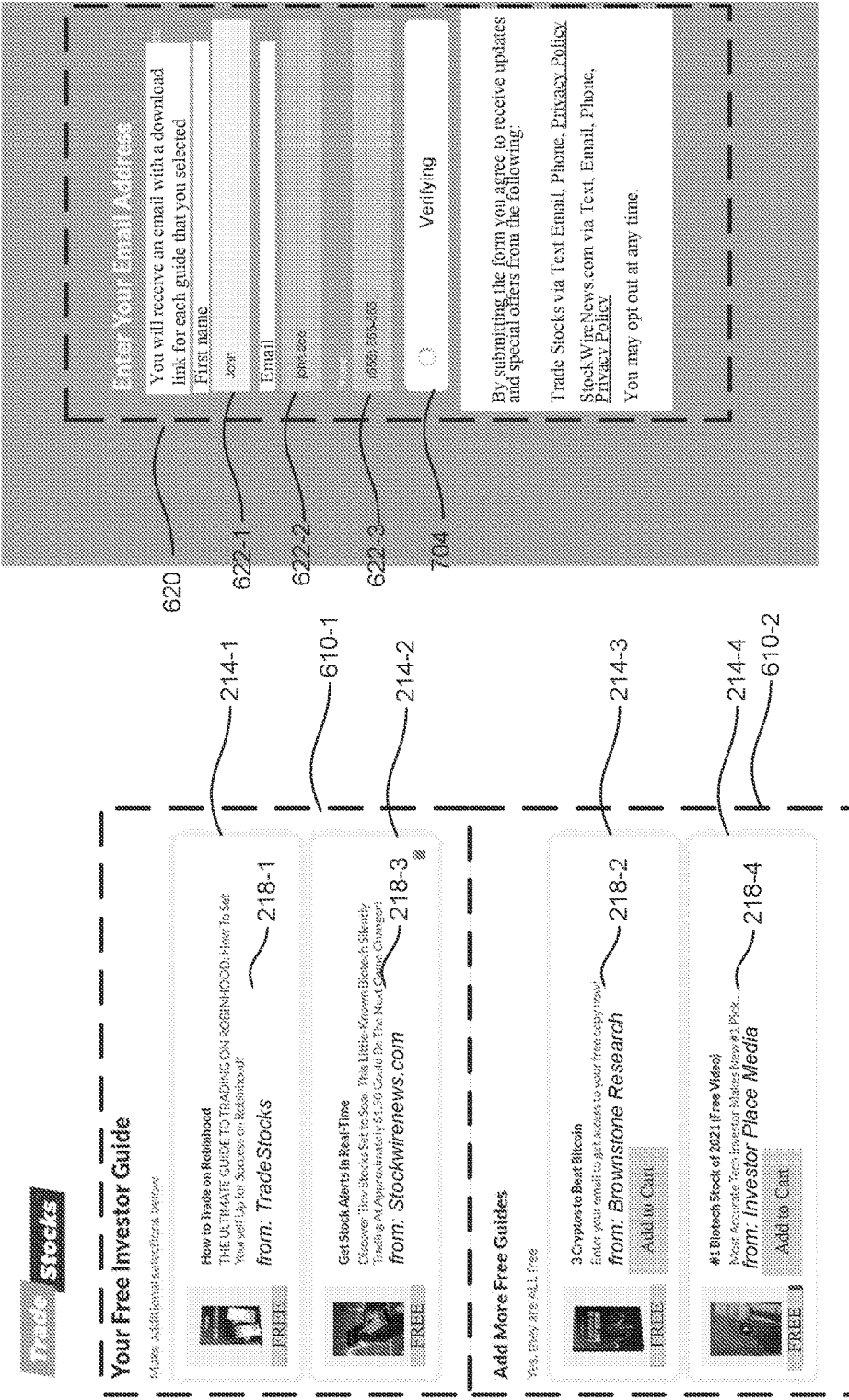
Figure 7E:
FIG. 7E illustrates a graphical user interface for confirming another distribution of a content item to an address of a user, in accordance with an embodiment of the present disclosure.

Each respective content item 214 is an item utilized by a user of a client device 300. A content item 214 is in a format that is coherent to the user, such as human readable text. As a non-limiting example, in some embodiments, a respective content item 214 is a media content item 214 or a promotional content item. For instance, in some embodiments, a content item 214 includes a media file, such as a video file (e.g., .MPEG, .WMV, etc.) and/or an audio file (e.g., .WAV, .MP3, etc.). In some embodiments, the content item 214 includes a client application (e.g., client application 320) for utilizing with the client device 300, such as a video game client application 320. In some embodiments, the content item 214 includes an electronic literature, such as an electronic book (e.g., first content item 214-1 of FIG. 6A, second content item 214-2 of FIG. 7C, etc.). As such, in such embodiments, the content item 214 is a digital content item 214, which allows the user of the client device 300 to engage with the content item 214 through the user interface 278 of the client device 300. However, the present disclosure is not limited thereto. For instance, in alternative embodiments, the content item 214 is a tangible item, such as a printed article or coupon. Referring briefly to FIG. 7D, a user interface 700-4 presents a list of a plurality of content items 214 includes a first content item 214-1 that is a first electronic book associated with a classification of securities trading (e.g., second classification 220-2 of FIG. 2), a second content item 214-2 that is a client application 320 associated with the classification 220 of securities trading, a third content item 214-3 that is second electronic book associated with the classification 220 of securities trading, and a fourth content item 214-4 that is a video file associated with the classification 220 of securities trading.

In some embodiments, a respective content item 214 is provided by a second user (e.g., user of second client device 300-2 of FIG. 5, user of third client device 300-3 of FIG. 5, etc.), which is different than the first user. Accordingly, the method 400 can provide curate a plurality of content items 214 for the first serve based on a diverse universe of content items 214 provided by the second user.

Block 404. Referring to block 404, the method 400 includes presenting a listing of a plurality of content items 214 via a display (e.g., display 382 of client device 300 of FIG. 3, block 530 of FIG. 5, block 532 of FIG. 5, block 540 of FIG. 5, etc.).

The plurality of content items 214 includes a first content item 214-1 selected by a first user (e.g., block 532 of FIG. 5). In some embodiments, the first user selects the first content item 214-1 by engaging with the first content item 214-1 prior to presenting the listing of the plurality of content items 214 (e.g., block 530 of FIG. 5). Accordingly, in such embodiments, the listing of the plurality of content items 214 is presented to the first user in accordance with the first user engaging with the first content item 214-1. As a non-limiting example, referring briefly to FIG. 7A, in some embodiments, a first user is presented with a first user interface 700-1 that is configured to encourage the first user to engage with one or more content items 214. Accordingly, the first user engages with the first content item 214-1 by selecting an engagement mechanism (e.g., first engagement mechanism 702-1, second engagement mechanism 702-2, etc.) associated with the first content item 214-1. From this, the first user is presented with a second user interface (e.g., user interface 600-1 of FIG. 6A, user interface 700-2 of FIG. 7B, etc.) that includes the listing of the plurality of content items 214, which can be different than the first user interface 700-1, and reflects the selection of the first content item 214-1 by the first user. However, the present disclosure is not limited thereto.

In some embodiments, each respective content item 214 in the catalog of content items 212 is associated with a corresponding resource allotment (e.g., resource allotment 216 of FIG. 2). The corresponding resource allotment 216 is a quantifiable amount of a resource that must be fulfilled in order to access (e.g., block 536 of FIG. 5) and/or distribute a respective content item 214 (e.g., block 538 of FIG. 5, block 542 of FIG. 5, etc.). For instance, in some embodiments, the first user is required to fulfill the corresponding resource allotment 216 associated with the respective content item 214 in order to receive the respective content item 214. In some embodiments, the corresponding resource allotment 216 is then provided to a corresponding source 218 of the respective content item 214 (e.g., event process 510 of FIG. 5).

In some embodiments, each respective content item 214 in the catalog of content items 212 is associated with a corresponding source of the respective content item 214 (e.g., source 218 of FIG. 2). Typically, the corresponding source 218 is a publication source 218 of the respective content item 214. In some embodiments, the corresponding source 218 provides the respective content item 214 to a curating system 200 (e.g., block 522 of FIG. 5). In some embodiments, the curating system 200 obtains the respective content item 214 and identifies the corresponding source 18 of the respective content item 214 from a plurality of public information and/or databases. In some embodiments, the corresponding publication source 218 includes an author of the respective content item 214. In some embodiments, the corresponding publication source 218 includes a publisher of the respective content item 214. In some embodiments, the corresponding publication source 218 includes an owner of the respective content item, such as a licensee of the respective content item 214. By including the association with the corresponding source 216 of the respective content item 214, the curating system 200 can facilitate communicating information associated with the selection of the respective content item (e.g., block 406 of FIG. 4A, e.g., block 510 of FIG. 5)) by the first user, such as one or more responses (e.g., prompt 622 of FIG. 6B, prompt 622 of FIG. 7C, block 536 of FIG. 5, etc.) provided by the first user. Additionally, in some embodiments, the first user is notified of the corresponding source 218 of the respective content item 214 in order to promote awareness of the corresponding source 218 with the first user and increase engagement between the first user and the corresponding source 218. For instance, referring briefly to FIG. 6G, in some embodiments, in response to receiving authorization to distribute the respective content item 214 (e.g., block 536 of FIG. 5), the corresponding source 218 communicates a digital report (e.g., digital report 750 of FIG. 7F, event process 510 of FIG. 5) that includes the respective content item 214.

In some embodiments, each respective content item 214 in the catalog of content items 212 is associated with a corresponding classification in a plurality of classification (e.g., classification 220 of FIG. 2). In such embodiments, each content item 214 in the plurality of content items 214 presented to the user via the display 382 is associated the corresponding classification 220 in the plurality of content items 214 of the first content item 214-1. Accordingly, in accordance with a determination that the first user engages with the first content item 214-1 by selecting the first content item 214-1, the curating system 200 can product the plurality of content items 214 of the listing based on groupings of content items 214 that are provided by the plurality of classifications 220. For instance, referring briefly to FIG. 6B, a user interface 600-2 presents a list of a plurality of content items 214 includes a first content item 214-1 that is a first electronic book associated with a first classification 220-1 of securities trading, a second content item 214-2 that is a second electronic book associated with the first classification 220-1 of securities trading, a third content item 214-3 that is third electronic book associated with the first classification 220-1 of securities trading, and a fourth content item 214-4 that is fourth electronic book associated with the first classification 220-1 of securities trading. As such, when the first user engages with the first content item 214 (e.g., engagement mechanism 702 of FIG. 7A), the listing of the plurality of content items 214 is restricted to those that belong to the first classification 220-1 of securities trading.

In some embodiments, a respective classification 220 in the plurality of classifications 220 is associated with a corresponding user demographic, such as a race of a respective user, an age of the respective user, an ethnicity of the respective user, a gender of the respective user, a marital status of the respective user, an income status of the respective user, an education status of the respective user, an employment status of the respective user, or a combination thereof.

In some embodiments, each respective classification 220 includes a predetermined selection of content items 214. In some embodiments, the predetermined selection of content items of a respective classification 220 is provided by the second user (e.g., block 506 of FIG. 5, block 508 of FIG. 5, etc.). For instance, referring briefly to FIG. 5, in some embodiments, a second user of a second client device 300 defines a classification 220 (e.g., block 504) and selects one or more content items 214 for inclusion in the classification 220. In some embodiments, the selection of the one or more content items 214 includes an initial selection of content items 214 (e.g., block 506 of FIG. 5) that contains the plurality of content items 214 of the listing for presentation to a respective user and a secondary selection of content items 214 (e.g., block 508 of FIG. 5) that includes a content item 214 (e.g., block 540 of FIG. 5) for presentation to the respective user through a digital report 750 (e.g., block 538 of FIG. 5) that is excluded from the plurality of content items 214.

Each respective content item 214 in the catalog of content items 212 is associated with a corresponding plurality of content item access conditions (e.g., content item access conditions 222 of FIG. 2). The first user must satisfy each content item access condition 222 in the corresponding plurality of content item access conditions 222 in order to receive access to a respective content item 214 (e.g., block 536 of FIG. 5). In this way, each respective content item access condition 222 defines a unique condition the first user must satisfy to receive a distribution of a respective content item 214. In some embodiments, the first user must satisfy a respective content item access condition 222 only once in order to receive a subsequent distribution of a content item 214 (e.g., block 542 of FIG. 5)

In some embodiment, a respective content item access condition 222 is configured by the second user (e.g., second user of second client device 300-2 of FIG. 5, second user of third client device 300-3 of FIG. 5). For instance, in some embodiments, the second user provides a respective content item 214 (e.g., block 522 of FIG. 5) and defines a corresponding plurality of content item access conditions 222 (e.g., blocks 504 and/or 506 of FIG. 5), such that each content item access condition 222 in the plurality of content item access conditions 222 is deemed satisfied (e.g., block 536 of FIG. 5, block 414 of FIG. 4B) prior to distributing the respective content item 214 (e.g., block 540 of FIG. 5). By way of example, in some embodiments, the corresponding plurality of content item access conditions 222 includes a first content item access condition 222-1 that is associated with a threshold resource allotment 216 that the first user must fulfill. As described supra, depending on the threshold resource allotment, the requirements of the first user can vary.

In some embodiments, the corresponding plurality of content item access conditions 222 that is associated with the respective content item 214 includes one or more privacy policy access conditions. In some embodiments, the corresponding plurality of content item access conditions 222 that is associated with the respective content item 214 includes one or more terms of agreement access conditions. In this way, each respective source 218 can have a unique privacy policy and/or terms of agreement that must be satisfied in order for a user to gain access to a respective content item 214 provided the respective source 218. In some embodiments, the curating system 200 products a single set of privacy policy and/or terms of agreement that is collectively produced from the unique privacy policy and/or terms of agreement of each respective content item 214 in the first virtual bin 610-1. By requiring the corresponding plurality of content item access conditions 222 to include one or more privacy policy access conditions and/or one or more terms of agreement access conditions, a corresponding source 218 of a respective content item 214 is ensured that engagement between the corresponding source 218 and the first user has mutual consent. Moreover, when receiving a response from the first user to an access condition response form (e.g., block 412 of FIG. 4B, block 536 of FIG. 5, access condition response form 620 of FIG. 7B, etc.), the method 400 can consolidate the one or more privacy policy access conditions and/or the one or more terms of agreement conditions to reduce a cognitive burden on the first user when reviewing the one or more privacy policy access conditions and/or the one or more terms of agreement conditions.

In some embodiments, the corresponding plurality of content item access conditions 222 that is associated with the respective content item 214 includes one or more requests for personal identifying information. Personal identifying information includes information associated with a respective user that, either alone or in combination, can be used to identify the respective user from a population of users. By way of example, in some embodiments, the one or more requests for personal identifying information of a respective content item access condition 222 is a request for a name of the first user, such as a first name (e.g., first prompt 622-1 of FIG. 6B) and/or a last name, a user name (e.g., social media user name), and the like. In some embodiments, the one or more requests for personal identifying information of a respective content item access condition 222 is a request for an electronic address associated with the first user (e.g., electronic address 304 of client device 300 of FIG. 3), such as an electronic mailing address (e.g., prompt 622-2 of FIG. 6A) and/or a telephone address (e.g., prompt 622-3 of FIG. 7D). In some embodiments, the one or more requests for personal identifying information of a respective content item access condition 222 is a request for geographic information including a current and/or past residence of the first user, such as a physical residential and/or mailing address of the first user. By requiring the user to fulfill the content item access conditions 222 that requests personal identifying information, the systems and methods of the present disclosure can provide improved curation when presenting the plurality of content items to respective user (e.g., block of FIG. 5, block 540 of FIG. 5, block 542 of FIG. 5, etc.).

In some embodiments, the plurality of content items 214 includes a second content item 214-2. This second content item 214-2 is selected by a second user from a catalog of content items (e.g., catalog of content items 212 of FIG. 2, block 506 and/or 508 of FIG. 5, etc.). This second user is different than the first user, which selects the first content item 214-1 (e.g., user of client device 300-2 of FIG. 5, user of client device 300-3 of FIG. 5, etc.). By having both the first user and the second user select a respective content item 214 in the plurality of content items 214, the first user is provided with an improved presentation of curated content items 214 from the catalog of content items 212. Moreover, by allowing the second user to select the second content item 214-2 (e.g., block 506 of FIG. 5, block 508 of FIG. 5), the second user is provided an opportunity to modify the selection of the second content item 214-2, such as by choosing a different content item 214-2 from the catalog of content items 212 based on different intentions of the second user (e.g., block 504 of FIG. 5, block 540 of FIG. 5, block 510 of FIG. 5, etc.). By way of example, in some embodiments, the second user is a publisher of the respective content item 214, which allows the second user to selective promote the respective content item 214 based on the selection of the first content item 214-1 by the first user (e.g., third client device 300-3 of FIG. 5). However, the present disclosure is not limited thereto. In other embodiments, the second user is a system administrator, such as an administrator of a curating system (e.g., curating system 200 of FIG. 2). In other embodiments, the second user is a third party, such as a third user of a client device 300 (e.g., second client device 300-2 of FIG. 5).

The listing of the plurality of content items 214 includes a first virtual bin (e.g., first virtual bin 610-1 of FIG. 6B, first virtual bin 610-1 of FIG. 6D, first virtual bin 610-1 of FIG. 7B, etc.) and a second virtual bin (e.g., second virtual bin 610-2 of FIG. 6B, second virtual bin 61-2 of FIG. 6C, second virtual bin 610-2 of FIG. 7D, etc.). Collectively, the first virtual bin 610-1 and the second virtual bin 610-1 include each respective content item 214 in the plurality of content items 214.

Each respective bin 610 provides a corresponding graphical description (e.g., graphical descriptions 630 of FIG. 6B, graphical descriptions 630 of FIG. 7B, etc.) for each respective content items 214 associated with a respective bin 610. Accordingly, the corresponding graphical description 630 allows for a visualization of a respective content item 214 and one or more stored associations of the respective content item 214. In some embodiments, the one or more stored associations that is visualized by the corresponding graphical description 630 includes the corresponding resource allotment 216 of the respective content item 214. In some embodiments, the one or more stored associations that is visualized by the corresponding graphical description 630 includes the corresponding source 218 of the respective content item 214. In some embodiments, the one or more stored associations that is visualized by the corresponding graphical description 630 includes the corresponding classification 220 of the respective content item. However, the present disclosure is not limited thereto.

In some embodiments, the first virtual bin 610-1 includes the corresponding graphical description 630 for each respective content item 214 that is selected by the first user. Accordingly, the listing of the plurality of content items 214 further includes the second virtual bin 610-2 that provides the corresponding graphical description 630 for each respective content item 214 in the plurality of content items 214 that is not present in the first virtual bin 610-1. Said otherwise, the second virtual 610-2 includes each respective content item 214 that the first user has not selected. In this way, the first virtual bin 610-1 and the second virtual bin 610-2 provide distinct graphical groupings of one or more respective content items 214 that is associated with either the first virtual bin 610-1 or the second virtual bin 610-2. As such, a first set of content items 214 in the plurality of content items 214 belonging to the first virtual bin 610-1 is mutually exclusive with a second set of content items 214 in the plurality of content items 214 belonging to the second virtual bin 610-2.

In some embodiments, the method 400 includes presenting an access condition form (e.g., access condition form generated by access condition form module 224 of FIG. 2, access condition form 620 of FIG. 6D, access condition form 620 of FIG. 7D, etc.) via the display 382. In some embodiments, the access condition form 620 is presented via the display 382 on the same user interface as the listing of the plurality of content items 214, such as user interface 600-4 of FIG. 6D or user interface 700-3 of FIG. 7C, in which the first virtual bin 610-1, the second virtual bin 610-2, and the access condition form 620 are presented of a respective user interface. By presenting the access condition form 620 on the same user interface as the listing of the plurality of content items 214, the first user is notified of However, the present disclosure is not limited thereto. In alternative embodiments, the access condition form 620 is presented on a different user interface than that of the first virtual bin 610-1 and the second virtual bin 610-2.

The access condition form 620 includes an initial set of prompts (e.g., prompts 622 of FIG. 6B, prompts 622 of FIG. 6C, prompts 622 of FIG. 7B, prompts 622 of FIG. 7D, etc.). Collectively, the initial set of prompts 622 is produced from each corresponding plurality of content item access conditions 222 that is associated with each respective content item 214 that is in the first virtual bin 610-1. For instance, referring briefly to FIG. 2, a first content item 214-1 includes a first corresponding content item access condition 222-1 and a second content item 214-2 includes a second corresponding content item access condition 222-2. Here, consider that the first corresponding content item access condition 222-1 is associated with a request for a name of the first user and the second corresponding content access condition 222-2 is associated with a request for the electronic address associated with the first user (e.g., telephone address, E-mail address, etc.). Accordingly, if both the first content item 214-1 and the second content 214-2 are in the first virtual bin, the initial set of prompts 622 will include a first prompt 622-1 that requires the first user to respond with a name of the first user and a second prompt that requires the first user to respond with an electronic address of the first user. By collectively producing the initial set of prompts 622 from the each corresponding plurality of content item access conditions 222 that is associated with each respective content item 214 that is in the first virtual bin 610-1, the first user submits responses to the prompts 622 (e.g., block 536 of FIG. 5) that is consistent when requesting access (e.g., distribution) of the first content item 214-1 and the second content item 214-2. Moreover, the first user is prevented from producing duplicative responses should the first content item 214-1 and the second content item 214-2 include substantially similar content item access conditions 222. For instance, consider a third content item access condition 222-3 of the first content item 214-1 that requests a first name and initial of a middle name of the first user and a fourth content item access condition 222-4 of the second content item 214-2 that requests the first name and a last name of the first user. Accordingly, the third content item access condition 223-3 and the fourth content item access condition 224-4 collectively produce a prompt 662 that requires the first user to respond with the first name, the initial of the middle name, and the last of the user first. However, the present disclosure is not limited thereto.

In some embodiments, the corresponding graphical description 630 for each respective content item 214 in the plurality of content items 214 includes a value of the corresponding resource allotment 216 of the respective content item 214. In some embodiments, the value of the corresponding resource allotment 216 of the respective content item 214 is a price of the respective content item 214, such that the first user must fulfill a financial resource allotment 216 to access the respective content item 214. For instance, the value of the corresponding resource allotment 216 of the respective content item 214 can be a flat rate value, such as a market value, or a percentage value (e.g., a percentage of the market value). In some embodiments, the corresponding graphical description 630 of the value of the corresponding resource allotment 216 is required to be zero.

In some embodiments, the corresponding graphical description 630 for each respective content item 214 in the plurality of content items 214 includes the corresponding publication source 218 of the respective content item 214. Referring briefly to FIG. 6B, in some embodiments, the corresponding publication source 218 is the owner or publisher of the respective content item 214. In alternative embodiments, the corresponding publication source 218 is the author of the respective content item 214. By uniformly presenting the corresponding publication source for each respective content item 214 in the plurality of content items 214, the first user is notified of the corresponding publication source 218 which encourages engagement with the corresponding publication source 218 without burdening the first user with having to locate such information. This also allows the first user to select a respective content item 214 (e.g., block 406 of FIG. 4A) based on a preference for a particular corresponding source 218 of the respective content item 214.

In some embodiments, the corresponding graphical description 630 for each respective content item 214 in the plurality of content items 214 includes an image of the respective content item 214, such as a thumbnail image of the respective content item 214. By providing an image of the respective content item 214, the first user is provided with an easily identifiable feature for each respective content item 214. Referring briefly to FIG. 7C, in some embodiments, the image of the respective content item 214 is a cover of the respective content item, such as an album cover or a portion of book cover (e.g., front cover, back cover, a front inside flap, a back inside flap, etc.).

In some embodiments, the corresponding graphical description 630 for each respective content item 214 in the plurality of content items 214 includes a summary of the respective content item 214. In some embodiments, the summary of the respective content item 214 is provided by the corresponding source 218 of the respective content item 214, such as a unique message from an author of the respective content item 214. In some embodiments, the summary of the respective content item 214 is an abstract of the respective content item 214. In some embodiments, the summary of the respective content item 214 is a predetermined number of initial words or characters of the respective content item 214, such as a reproduction of an initial forty words of the respective content item 214.

Block 406. Referring to block 406, the method 400 includes detecting (e.g., via one or more processors, such as CPU 274 of FIG. 2, CPU 374 of FIG. 2) a selection of a respective content item 214 of the second virtual bin 610-2 by the first user (e.g., block 534 of FIG. 5). This detecting the selection of the respective content item 214 is responsive to the presenting of the listing of the plurality of content items 214 (e.g., block 404 of FIG. 4A) on the display 382. In some embodiments, the selection of the respective content item 214 is detected through input (e.g., input 380 of FIG. 3) of the client device 300, such as the first user engaging with an engagement mechanism 702 associated with the respective content item 214. For instance, referring briefly to FIG. 7B, a first virtual bin 610-1 includes a first content item 214-1 in a plurality of content items of a listing presented via a user interface 700-2. The user interface 700-2 further includes a second virtual bin 610-2 including a second content item 214-2, a third content item 214-3, and a fourth content item 214-4. Accordingly, the second content item 214-2, the third content item 214-3, and the fourth content item 214-4 are each afforded a corresponding engagement mechanism 702, which allows the first user to select a respective content item 214 of the corresponding engagement mechanism 702.

As such, the second virtual bin 610-1 provides the first user with an opportunity to select at least one content item 214 in the plurality of content items 214 other than the first content item 214-1 of the first virtual bin 610-1 that the first user selected (e.g., block 404 of FIG. 4A). This opportunity thus increases a number of content items 214 that the first user can select to receive, which reduces a burden of the first user of otherwise having to navigate multiple user interfaces to receive the same number of content items 214. Additionally, in some embodiments, the selection from the second virtual yin 610-2 increases engagement with the first user and the second user by allowing the first user to receive more one or more content items 214 associated with the second user other than the first content item 214-1.

Block 408. Referring to block 408, the method 400 includes reassigning the respective content item 214 from the second virtual bin 610-2 to the first virtual bin 610-1. This reassigning of the respective content item 214 from the second virtual bin 610-1 to the first virtual bin 610-2 is performed upon detecting the selection by the first user of the respective content item 214 of the second virtual bin 610-2.

In some embodiments, the first user is presented with an authorization request to confirm the reassigning of the respective content 214 from the second virtual bin 610-2 to the first virtual bin 610-1. For instance, referring briefly to FIG. 6D, in an alternative embodiment, the first user is presented with an authorization request to confirm the reassigning of the respective content 214 from the first virtual bin 610-1 to the second virtual bin 620-1. Said otherwise, in such alternative embodiments, the first user is deselecting the respective content 214. However, one of skill in the art will appreciate that the present disclosure is not limited thereto.

Block 410. Referring to block 410, the method 400 includes updating and presenting the access condition form 620 by updating the initial set of prompts 622 to an updated set of prompts 622. This updating and presenting of the access condition form 620, is based on the detecting the selection of the respective content item (e.g., block 406 of FIG. 4A, block 532 of FIG. 5, block 534 of FIG. 5, block 540 of FIG. 5). Moreover, the updated and presenting of the access condition form 620 is via the display 382 of the client device 300. In this way, in some embodiments, the updating and presenting of the access condition form 620 occurs dynamically on the display. By dynamically updating and presenting the access condition form 620, the first user is notified in real time of the responses required by the first user to access the content items in the first virtual bin 610-1 as the first user selects one or more content items of the second virtual bin 610-2 for inclusion in the first virtual bin 610-1.

Accordingly, the updated set of prompts 622 of the access condition form 620 is collectively produced from the corresponding plurality of content item access conditions 222 that is associated with each respective content item 214 in the first virtual bin 610-1 after the reassigning of the respective content item 214 (e.g., block 408 of FIG. 4A). Said otherwise, a set of prompts of the access condition form 620 is collectively produced dynamically from the corresponding plurality of content item access conditions that is associated with each respective content item 214 the first user selects into the first virtual bin 610-1.

As a non-limiting example, referring briefly to FIGS. 7B and 7C, initially at FIG. 7B a first user selects a first content item 214-1 (e.g., engages with the first content item 214-1 via engagement mechanism 702 of FIG. 7A, block 534 of FIG. 5, block 404 of FIG. 4A), which places the first content item 214-1 in a first virtual bin 610-1 presented through a user interface 700 of a display 382 of a client device 300. Based on a first corresponding content item access condition 222-1 associated with the first content item 214-1 in the first virtual bin 610-1, an initial set of prompts 622 of an access condition form 620 is presented to the first user. Here, the first corresponding content item access condition 222-1 is associated with a privacy policy of the first content item 214-1. Moreover, a second virtual bin 610-2 includes each respective content item 214 in a plurality of content items 214 of a listing presented to the first user that is not present in the first virtual bin 610-1. Here, the second virtual bin 610-2 includes a second content item 214-2, a third content item 214-3, and a fourth content item 214-4. From this, the first user selects (e.g., block 406 of FIG. 4A) the second content item 214-2 and the third content item 214-3 based on a desire of the first user to access the second content item 214-2 and the third content item 214-3. Accordingly, referring to FIG. 7C, the second content item 214-2 and the third content item 214-3 are reassigned to the first virtual bin 610-1 (e.g., block 408 of FIG. 4A). From this, the access condition form 620 is updated and presented to the first user, which reflects an updated set of prompts 622. This updated set of prompts 622 is collected produced from the from the corresponding plurality of content item access conditions 222 associated with each respective content item 214 in the first virtual bin 610-1. In the present example, the updated set of prompts 622 includes the first corresponding content item access condition 222-1 associated with the first content item 214-1, a second corresponding content item access condition 222-2 associated with the second content item 214-2, and a third corresponding content item access condition 222-3 associated with the third content item 214-3. In the present example, the second corresponding content item access condition 222-2 and the third corresponding content item access condition 222-3 are each privacy policies associated with the respective content item 214. From this, the first user is provided with an opportunity to add and/or remove (e.g., select and/or deselect) a respective content item 214 from the first virtual bin 610-1 prior to submitting a response to one or more prompts 622 of the access condition form 620.

In some embodiments, the updating and presenting of the access condition form 620 further includes reassigning a third content item 214-3 from the catalog to the plurality of content items 212. From this, the third content item 214-3 is reassigned from the catalog of content items 212 to the second virtual bin 610-2. Accordingly, the plurality of content items 214 of the listing presented to the first user can update to include additional content items 214 to replace a respective content item 214 that has been reassigned from the second virtual bin 610-1 to the first virtual bin 610-1 by the first user.

Block 412. Referring to block 412 of FIG. 4B, the method 400 includes receiving, a plurality of responses to the updated set of prompts 622 of the access condition form 620 from the first user (e.g., block 536 of FIG. 5). For instance, in some embodiments, the plurality of responses is provided by the first user in electronic form via the input 380 of the client device 300. By way of example, referring briefly to FIG. 7C, a first prompt 622-1 of the access condition form 620 is produced from a first content item access condition 222-1 that requires a first name of the first user and a second prompt 622-2 of the access condition form 620 is produced from a second content item access condition 222-2 that requires an electronic mailing address of the first here. Accordingly, in the present example, the first user has provided a first response of "John" in a first field of the access condition form 620 and a second response of "john.doe@e.mail" in a second field of the access condition form 620.

The prompts 622 are configured such that the plurality of responses provided by the first user satisfies each corresponding content item access condition 222 in the corresponding plurality of content item access conditions 222 that is associated with each respective content item 214 in the first virtual bin 610-1 after the reassigning the respective content item 214 from the second virtual bin 610-2 to the first virtual bin 610-1. For instance, in some embodiments, the first user is presented with a request (e.g., requests 706 of FIG. 7C) to provide a response for each prompt 622 that the first user has not responded to. Accordingly, since the prompts 622 are collectively produced from each corresponding content item access condition 222 in the corresponding plurality of content item access conditions 222 that is associated with each respective content item 214 in the first virtual bin 610-1, the prompts provide a convenient, consolidated mechanism to obtain the responses from the user that are required to satisfy each corresponding content item access condition 222.

Block 414. Referring to block 414, in some embodiments, the method 400 includes distributing each content item 214 in the first virtual bin 610-1 of the detecting the selection of the respective content item 214 to an address associated with the first user (e.g., electronic address 304 of FIG. 4) (e.g., block 538 of FIG. 5, block 542 of FIG. 5, block 510 of FIG. 5, etc.). Accordingly, this distributing of each content item 214 in the first virtual bin 610-1 curates and distributes at least one content item including the first content item 214-1 selected by the first user (e.g., block 404 of FIG. 4A, block 532 of FIG. 5, etc.) and/or the second content item 214-2 selected by the first user (e.g., block 406 of FIG. 4A, block 534 of FIG. 5, etc.).

In embodiments, the address associated with the first user is an electronic address (e.g., electronic address 304 of client device 300 of FIG. 3). In some embodiments, the electronic address includes an electronic mailing address (e.g., E-mail address) associated with the first user. By way of example, referring briefly to FIGS. 6G through 6I, a variety of user interfaces 600 are provided which present one or more content items 214 that is distributed to the first user by way of the electronic mailing address associated with the first user. However, the present disclosure is not limited thereto. For instance, in some embodiments, the electronic address 304 includes a telephone number associated with the first user. In some embodiments, the address associated with the first user is a physical mailing address.

Figure 6H:
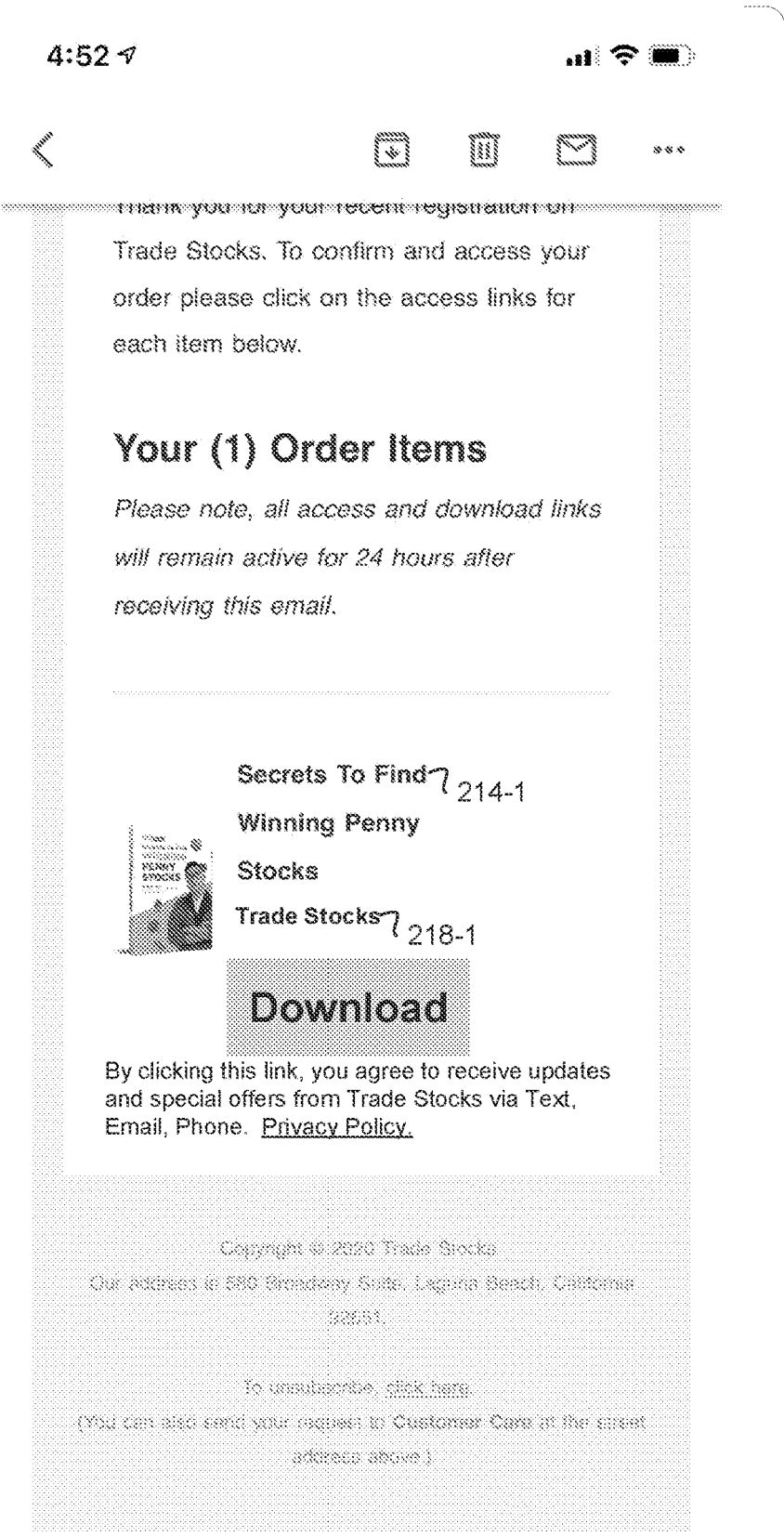
Figure 6I:
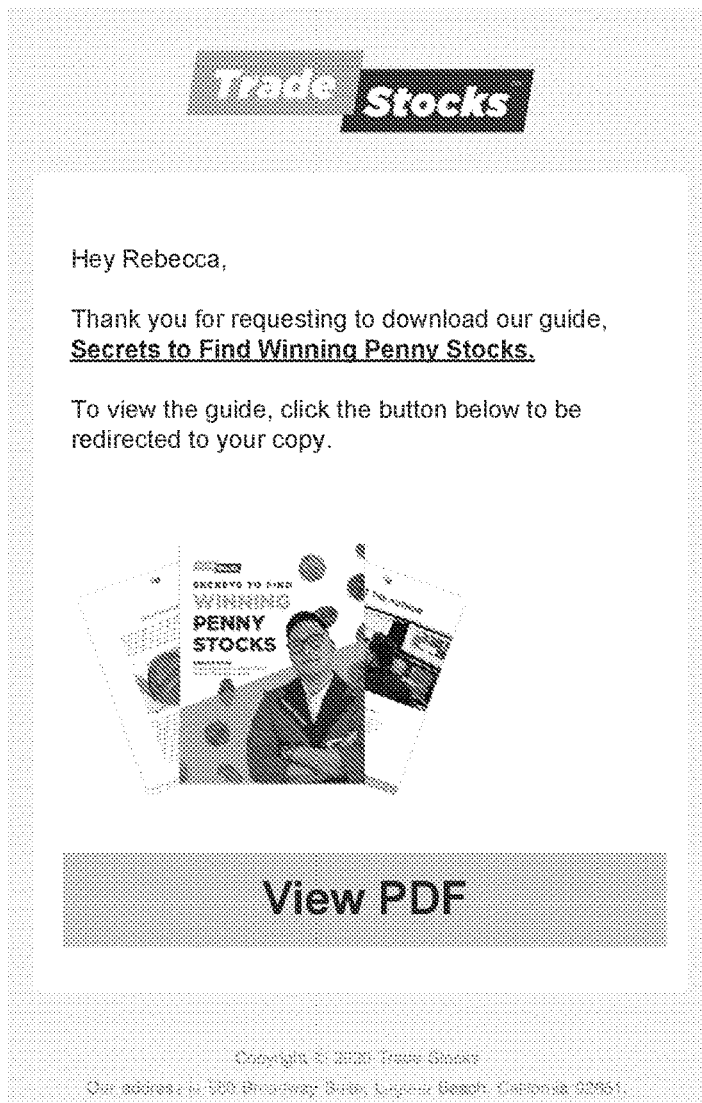
Figure 7F:
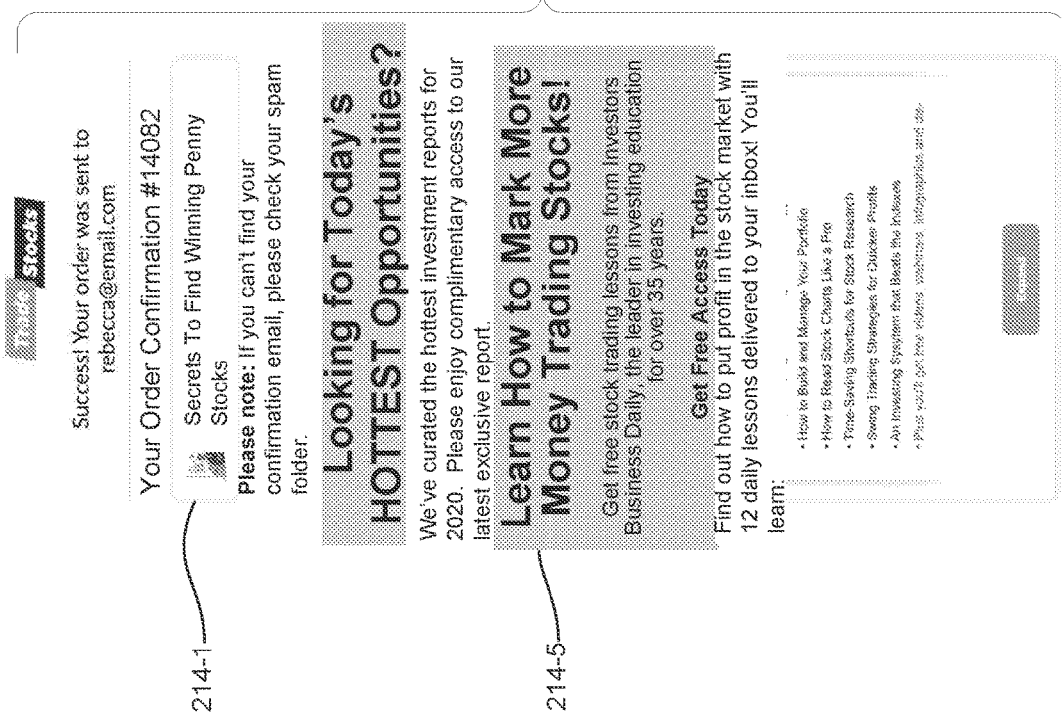
FIGS. 7F, 7G, and 7H collectively illustrate graphical user interfaces for distributing another content item by presenting a digital report at a client device, in accordance with an embodiment of the present disclosure.
Figure 7G:
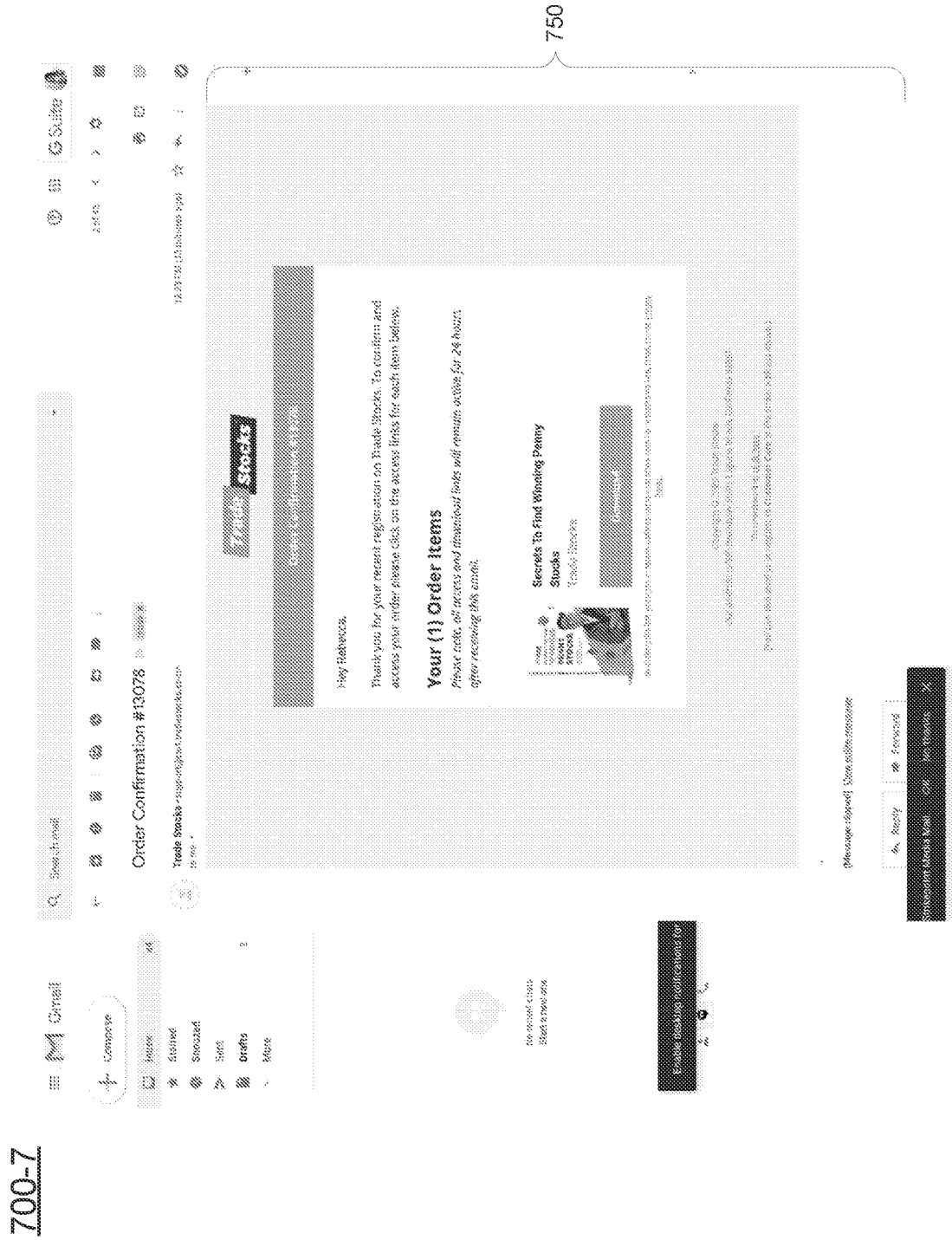
Figure 7H:
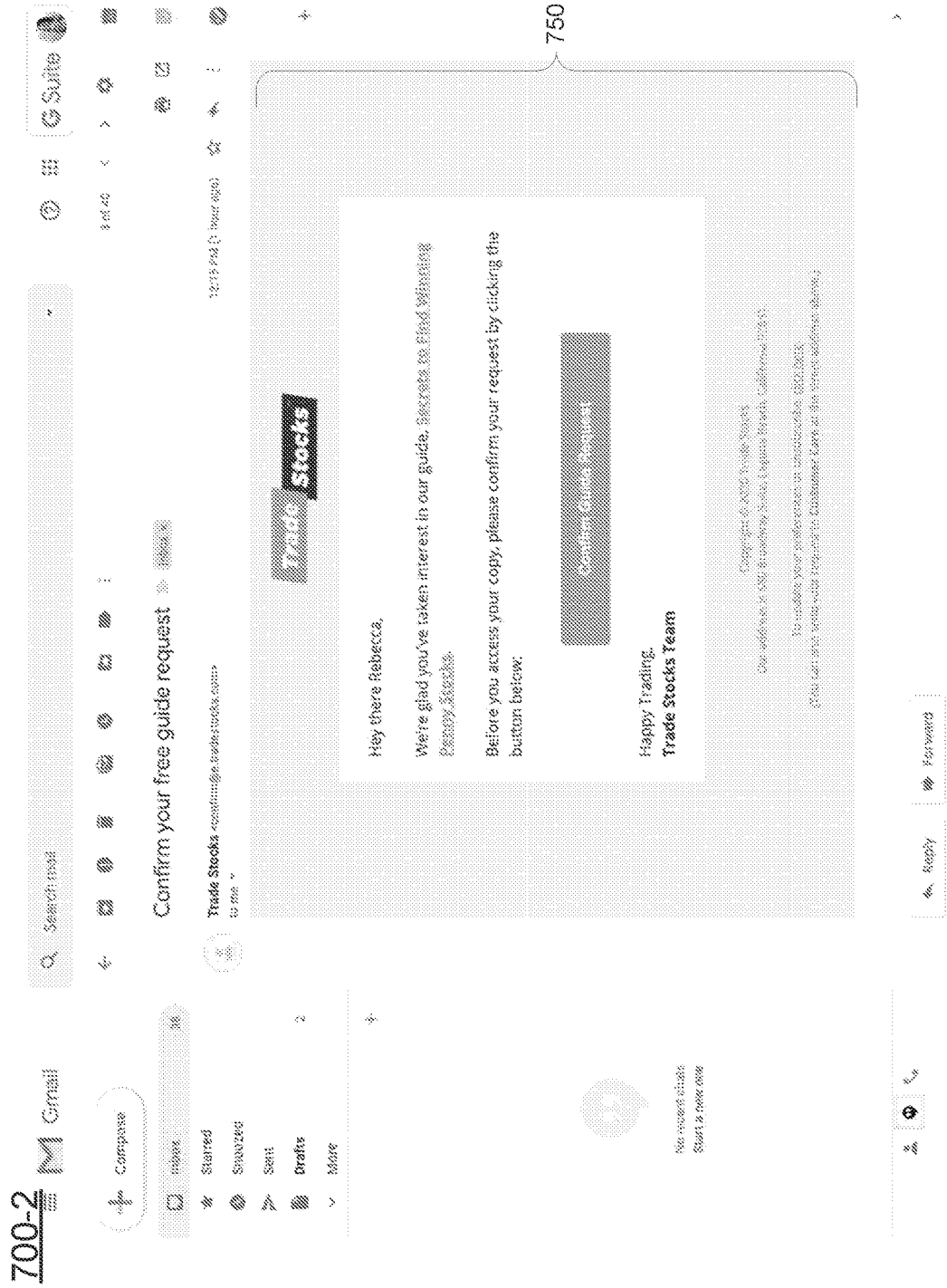

In some embodiments, the distributing of a respective content item 214 in the first virtual bin 610-1 includes generating an digital report (e.g., digital report 750 of FIG. 6F, digital report 750 of FIG. 6G, digital report 750 of FIG. 6H, digital report 750 of FIG. 7F, digital report 750 of FIG. 7G, digital report 750 of FIG. 7H, block 510 of FIG. 5, etc.). In such embodiments, the digital report 750 includes the respective content 214, such as a first respective content item 214-1 electronically attached to the digital report 750. In some embodiments, the digital report 750 includes one or more embedded links that provides access to the respective content item 214. Referring briefly to FIG. 6G, in some embodiments, the curating system 200 communicates authorization to a corresponding source 218 of a respective content item 214 of the distributing, such that the corresponding source 218 can generate and provide the digital report 750, which increases engagement between the first user and the corresponding source, such as by presenting an additional content item 214 within the digital report 750 (e.g., blocks 540-542 of FIG. 5).

In some embodiments, the digital report 750 includes a respective content item 214 that is selected from the catalog of content items 212 (e.g., fifth content item 214-5 of FIG. 7F, fifth content item 214-5 of FIG. 7F, block 508 of FIG. 5, block 540 of FIG. 5, etc.). In some embodiments, the respective content item 214 is excluded from the plurality of content items 214 of the listing presented to the first user (e.g., block 404 of FIG. 4A). Accordingly, the digital report 750 provides a unique opportunity to present one or more content items 214 that have yet to be presented to the first user through the first virtual bin 610-1 or the second virtual bin 610-2 (e.g., block 540 of FIG. 5), and further distribute the one or more content items 214 that have yet to be presented to the first user through the first virtual bin 610-1 or the second virtual bin 610-2 (e.g., block 542 of FIG. 5). By way of example, in some embodiments, the respective content item 214 presented to the first user through the digital report 750 is selected from the catalog of content items 212 in accordance with a determination that a corresponding classification 220 of the respective content item 222-1 and the corresponding classification 220 of the first content item 214-1 are the same classification 220 (e.g., the respective content item 222-1 is associated with a third classification 220-3 and the first content item 214-1 is associated with the third classification 220-3 (e.g., blocks 540-542 of FIG. 5). In some embodiments, each content item 214 that is associated with the same classification 220 is further associated with the same corresponding source 218. For instance, referring briefly to FIG. 6D, a listing of a plurality of content items 214 is presented (e.g., block 404 of FIG. 4A) that includes two or more content items 214 that belong to a first classification 220-1 associated with a first corresponding source 218-1 to which the two or more content items 214 are further associated with. However, the present disclosure is not limited thereto.

In some embodiments, the method 400 further includes repeating the detecting of the section of the respective content item 214 by the first user (e.g., block 406 of FIG. 4A), the reassigning of the respective content item 214 from the second virtual bin 610-2 to the first virtual bin 610-1 (e.g., block 408 of FIG. 4A), and the updating and presenting of the access condition form 620 (e.g., block 410 of FIG. 4A). In such embodiments, this repeating is performed one or more times for each successive content item 214 in the second virtual bin 610-2 selected by the first user.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

REFERENCES CITED AND ALTERNATIVE EMBODIMENTS

All references cited herein are incorporated herein by reference in their entirety and for all purposes to the same extent as if each individual publication or patent or patent application was specifically and individually indicated to be incorporated by reference in its entirety for all purposes The present invention can be implemented as a computer program product that includes a computer program mechanism embedded in a non-transitory computer-readable storage medium. For instance, the computer program product could contain instructions for operating the user interfaces described with respect to FIGS. 2, 3, 6A, 6B, 6C, 6D, 6E, 6F, 6G, 6H, 6I, 7A, 7B, 7C, 7D, 7E, 7G, and 7H. These program modules can be stored on a CD-ROM, DVD, magnetic disk storage product, USB key, or any other non-transitory computer readable data or program storage product.

Many modifications and variations of this invention can be made without departing from its spirit and scope, as will be apparent to those skilled in the art. The specific embodiments described herein are offered by way of example only. The embodiments were chosen and described in order to best explain the principles of the invention and its practical applications, to thereby enable others skilled in the art to best utilize the invention and various embodiments with various modifications as are suited to the particular use contemplated. The invention is to be limited only by the terms of the appended claims, along with the full scope of equivalents to which such claims are entitled.

What is claimed is:

1. A method for curating and distributing at least one content item, the method comprising
for each respective user in a plurality of users, wherein the plurality of users comprises more than four users:
A) presenting, via a display of a first client device in a plurality of client devices, a first user interface comprising a listing of a plurality of content items and an access condition form, wherein:
the plurality of content items comprises a first content item selected by a first user associated with the first client device in the plurality of client devices and a second content item selected by a second user from a catalog of content items, the second user associated with a second client device in the plurality of client devices, wherein
each respective content item in the catalog of content items is associated with:
(i) a corresponding resource allotment,
(ii) a corresponding publication source,
(iii) a corresponding classification in a plurality of classifications, wherein each content item in the plurality of content items is associated the corresponding classification in the plurality of classifications of the first content item, and
(iv) a unique corresponding plurality of content item access conditions, wherein each content item access condition in the unique corresponding plurality of content item access conditions controls, at least in part, distribution of a respective content item,
the listing of the plurality of content items comprises:
a first virtual bin that provides a corresponding graphical description for each respective content item in the plurality of content items selected by the first user, and
a second virtual bin that provides a corresponding graphical description for each respective content item in the plurality of content items that is both (i) associated with a content item in the first virtual bin and (ii) not present in the first virtual bin, and
the access condition form comprises a listing of an initial set of prompts collectively produced from each corresponding plurality of content item access conditions associated with each respective content item in the first virtual bin, wherein each prompt in the initial set of prompts is configured to illicit a response by the first user confirming conditional distribution of one or more content items in the first virtual bin;
B) detecting, responsive to the presenting A), a selection, in electronic form at the first client device, by the first user of a respective content item of the second virtual bin;
C) upon detecting the selection by the first user of a respective content item of the second virtual bin, reassigning the respective content item from the second virtual bin to the first virtual bin;
D) updating and presenting, based on the detecting B), via the display of the first client device, the access condition form and the listing of the plurality of content items of the first user interface by (i) updating the initial set of prompts to display an updated set of prompts on the first user interface, wherein the updated set of prompts is collectively produced from the unique corresponding plurality of content item access conditions associated with each respective content item in the first virtual bin after the reassigning C), and (ii) updating the first virtual bin and the second virtual bin to display the reassigning the respective content item from the second virtual bin to the first virtual bin;
E) receiving, in electronic form at the first client device, from the first user, a plurality of responses to the updated set of prompts, wherein the plurality of responses satisfies each corresponding content item access condition in the unique corresponding plurality of content item access conditions associated with each respective content item in the first virtual bin after the reassigning C); and F) distributing, in accordance with a determination that each content item access condition in the unique corresponding plurality of content item access conditions associated with each respective content item in the first virtual bin is satisfied by the plurality of responses, each content item in the first virtual bin of the detecting B) to an address associated with the first user, thereby curating and distributing the at least one content item.

2. The method of claim 1, the method further comprising repeating the detecting B), the reassigning C), and the updating and presenting D) one or more times for each successive content item in the second virtual bin selected by the first user.

3. The method of claim 1, wherein the catalog of content items comprises a plurality of media content items and a plurality of promotional content items.

4. The method of claim 3, wherein the plurality of media content items comprises a written educational media content item.

5. The method of claim 1, wherein the corresponding resource allotment is fulfilled by the first user prior to the distributing F).

6. The method of claim 5, wherein the unique corresponding plurality of content item access conditions comprises a first content item access condition associated with a threshold resource allotment fulfilled by the first user prior to the distributing F).

7. The method of claim 1, wherein the unique corresponding plurality of content item access conditions associated with the respective content item comprises one or more privacy policy access conditions, one or more terms of agreement access conditions, one or more requests for personal identifying information, or a combination thereof.

8. The method of claim 1, wherein the second user is a publisher of the second content item.

9. The method of claim 1, wherein the second user is a system administrator.

10. The method of claim 1, wherein the corresponding graphical description for each respective content item in the plurality of content items comprises a value of the corresponding resource allotment of the respective content item, the corresponding publication source of the respective content item, an image of the respective content item, a summary of the respective content item, or a combination thereof.

11. The method of claim 1, wherein the catalog of content items comprises at least 100 content items, at least 250 content items, at least 500 content items, at least 1,000 content items, at least 10,000 content items, or at least 100,000 content items.

12. The method of claim 1, wherein the plurality of content items comprises 5 or less content items, 10 or less content items, 15 or less content items, or between 2 and 15 content items.

13. The method of claim 1, wherein the address associated with the first user is an electronic mailing address.

14. The method of claim 1, wherein the address associated with the first user is a physical mailing address.

15. The method of claim 1, wherein the updating and presenting D) further comprises reassigning a third content item from the catalog to the plurality of content items, thereby reassigning the third content item to the second virtual bin.

16. A computer system for curating and distributing at least one content item, the computer system comprising one or more processors, a display, and a memory coupled to the one or more processors, the memory comprising one or more programs configured to be executed by the one or more processors to perform a method, the method comprising:
for each respective user in a plurality of users, wherein the plurality of users comprises more than four users:
A) presenting, via a display of a first client device in a plurality of client devices, a first user interface comprising a listing of a plurality of content items and an access condition form, wherein:
the plurality of content items comprises a first content item selected by a first user associated with the first client device in the plurality of client devices and a second content item selected by a second user from a catalog of content items, the second user associated with a second client device in the plurality of client devices, wherein
each respective content item in the catalog of content items is associated with:
(i) a corresponding resource allotment,
(ii) a corresponding publication source,
(iii) a corresponding classification in a plurality of classifications, wherein each content item in the plurality of content items is associated the corresponding classification in the plurality of classifications of the first content item, and
(iv) a unique corresponding plurality of content item access conditions, wherein each content item access condition in the unique corresponding plurality of content item access conditions controls, at least in part, distribution of a respective content item,
the listing of the plurality of content items comprises:
a first virtual bin that provides a corresponding graphical description for each respective content item in the plurality of content items selected by the first user, and
a second virtual bin that provides a corresponding graphical description for each respective content item in the plurality of content items that is both (i) associated with a content item in the first virtual bin and (ii) not present in the first virtual bin, and
the access condition form comprises a listing of an initial set of prompts collectively produced from each corresponding plurality of content item access conditions associated with each respective content item in the first virtual bin, wherein each prompt in the initial set of prompts is configured to illicit a response by the first user confirming conditional distribution of one or more content items in the first virtual bin;
B) detecting, responsive to the presenting A), a selection, in electronic form at the first client device, by the first user of a respective content item of the second virtual bin;
C) upon detecting the selection by the first user of a respective content item of the second virtual bin, reassigning the respective content item from the second virtual bin to the first virtual bin;
D) updating and presenting, based on the detecting B), via the display of the first client device, the access condition form and the listing of the plurality of content items of the first user interface by (i) updating the initial set of prompts to display an updated set of prompts on the first user interface, wherein the updated set of prompts is collectively produced from the unique corresponding plurality of content item access conditions associated with each respective content item in the first virtual bin after the reassigning C), and (ii) updating the first virtual bin and the second virtual bin to display the reassigning the respective content item from the second virtual bin to the first virtual bin;
- E) receiving, in electronic form at the first client device, from the first user, a plurality of responses to the updated set of prompts, wherein the plurality of responses satisfies each corresponding content item access condition in the unique corresponding plurality of content item access conditions associated with each respective content item in the first virtual bin after the reassigning C); and
- F) distributing, in accordance with a determination that each content item access condition in the unique corresponding plurality of content item access conditions associated with each respective content item in the first virtual bin is satisfied by the plurality of responses, each content item in the first virtual bin of the detecting B) to an address associated with the first user, thereby curating and distributing the at least one content item.

17. The computer system of claim 16, wherein the method further comprises repeating the detecting B), the reassigning C), and the updating and presenting D) one or more times for each successive content item in the second virtual bin selected by the first user.

18. The computer system of claim 16, wherein the catalog of content items comprises a plurality of media content items and a plurality of promotional content items.

19. The computer system of claim 16, wherein the unique corresponding plurality of content item access conditions associated with the respective content item comprises one or more privacy policy access conditions, one or more terms of agreement access conditions, one or more requests for personal identifying information, or a combination thereof.

20. A non-transitory computer readable storage medium storing one or more programs, the one or more programs comprising instructions, which when executed by a computer system cause the computer system to perform a method comprising:

for each respective user in a plurality of users, wherein the plurality of users comprises more than four users:
- A) presenting, via a display of a first client device in a plurality of client devices, a first user interface comprising a listing of a plurality of content items and an access condition form, wherein:
  - the plurality of content items comprises a first content item selected by a first user associated with the first client device in the plurality of client devices and a second content item selected by a second user from a catalog of content items, the second user associated with a second client device in the plurality of client devices, wherein
  - each respective content item in the catalog of content items is associated with:
    - (i) a corresponding resource allotment,
    - (ii) a corresponding publication source,
    - (iii) a corresponding classification in a plurality of classifications, wherein each content item in the plurality of content items is associated the corresponding classification in the plurality of classifications of the first content item, and
    - (iv) a unique corresponding plurality of content item access conditions, wherein each content item access condition in the unique corresponding plurality of content item access conditions controls, at least in part, distribution of a respective content item,
  - the listing of the plurality of content items comprises:
    - a first virtual bin that provides a corresponding graphical description for each respective content item in the plurality of content items selected by the first user, and
    - a second virtual bin that provides a corresponding graphical description for each respective content item in the plurality of content items that is both (i) associated with a content item in the first virtual bin and (ii) not present in the first virtual bin, and
  - the access condition form comprises a listing of an initial set of prompts collectively produced from each corresponding plurality of content item access conditions associated with each respective content item in the first virtual bin, wherein each prompt in the initial set of prompts is configured to illicit a response by the first user confirming conditional distribution of one or more content items in the first virtual bin;
- B) detecting, responsive to the presenting A), a selection, in electronic form at the first client device, by the first user of a respective content item of the second virtual bin;
- C) upon detecting the selection by the first user of a respective content item of the second virtual bin, reassigning the respective content item from the second virtual bin to the first virtual bin;
- D) updating and presenting, based on the detecting B), via the display of the first client device, the access condition form and the listing of the plurality of content items of the first user interface by (i) updating the initial set of prompts to display an updated set of prompts on the first user interface, wherein the updated set of prompts is collectively produced from the unique corresponding plurality of content item access conditions associated with each respective content item in the first virtual bin after the reassigning C), and (ii) updating the first virtual bin and the second virtual bin to display the reassigning the respective content item from the second virtual bin to the first virtual bin;
- E) receiving, in electronic form at the first client device, from the first user, a plurality of responses to the updated set of prompts, wherein the plurality of responses satisfies each corresponding content item access condition in the unique corresponding plurality of content item access conditions associated with each respective content item in the first virtual bin after the reassigning C); and
- F) distributing, in accordance with a determination that each content item access condition in the unique corresponding plurality of content item access conditions associated with each respective content item in the first virtual bin is satisfied by the plurality of responses, each content item in the first virtual bin of the detecting B) to an address associated with the first user, thereby curating and distributing the at least one content item.

\* \* \* \* \*